(12) United States Patent
Aratani et al.

(10) Patent No.: US 9,278,527 B2
(45) Date of Patent: Mar. 8, 2016

(54) INK JET RECORDING INK, INK JET RECORDING METHOD, INK JET RECORDING HEAD, AND INK JET RECORDING APPARATUS

(71) Applicant: CANON FINETECH INC., Misato-shi, Saitama-ken (JP)

(72) Inventors: Kanako Aratani, Kashiwa (JP); Ryuta Aoto, Misato (JP); Yuusuke Sumikawa, Kashiwa (JP); Takahiro Tsutsui, Matsudo (JP); Shintaro Suzuki, Yashio (JP); Masato Kawakami, Misato (JP)

(73) Assignee: Canon Finetech Inc., Misato-shi (JP)

( * ) Notice: Subject to any disclaimer, the term of this patent is extended or adjusted under 35 U.S.C. 154(b) by 0 days.

(21) Appl. No.: 14/474,547

(22) Filed: Sep. 2, 2014

(65) Prior Publication Data

US 2015/0070436 A1    Mar. 12, 2015

(30) Foreign Application Priority Data

Sep. 6, 2013  (JP) .................................. 2013-185457

(51) Int. Cl.
*B41J 29/38* (2006.01)
*B41J 2/15* (2006.01)
(Continued)

(52) U.S. Cl.
CPC ............ *B41J 2/1433* (2013.01); *B41J 2/17513* (2013.01); *B41J 2/17563* (2013.01);
(Continued)

(58) Field of Classification Search
USPC ...................................................... 347/9, 40
See application file for complete search history.

(56) References Cited

U.S. PATENT DOCUMENTS

| 6,874,881 B2 | 4/2005 | Suzuki et al. |
| 8,025,722 B2 | 9/2011 | Kawabe et al. |

(Continued)

FOREIGN PATENT DOCUMENTS

| EP | 1 285 949 A1 | 2/2003 |
| EP | 1 956 059 A2 | 8/2008 |

(Continued)

OTHER PUBLICATIONS

Jan. 26, 2015 European Search Report in European Patent Appln. No. 14183649.4.

(Continued)

*Primary Examiner* — Jason Uhlenhake
(74) *Attorney, Agent, or Firm* — Fitzpatrick, Cella, Harper & Scinto

(57) ABSTRACT

An ink jet recording ink including a pigment; water; and water-soluble compounds. The pigment comprises a resin-dispersed pigment dispersed with a (meth)acrylate-based random copolymer having an acid value of 100-160 mgKOH/g. The water-soluble compounds include at least ethylene urea and a water-soluble compound having a hydrophilicity-hydrophobicity coefficient defined by the following equation (A) of 0.37 or less The total content of the water-soluble compounds is 22-50 mass % with respect to the total amount of the ink The content of the ethylene urea is 11.0 mass % or more with respect to the total amount of the ink, and the proportion of the amount of the ethylene urea in the total amount of the water-soluble compounds is 50% by mass or less, Hydrophilicity-hydrophobicity coefficient=((water activity value of 20% aqueous solution)−(molar fraction of water in 20% aqueous solution))/(1−(molar fraction of water in 20% aqueous solution))    Equation (A).

10 Claims, 7 Drawing Sheets

(51) Int. Cl.
*B41J 2/14* (2006.01)
*B41J 2/175* (2006.01)
*C08K 5/3415* (2006.01)
*C09D 11/322* (2014.01)
*C09D 11/38* (2014.01)
*C09D 125/14* (2006.01)
*C09D 11/033* (2014.01)
*C09D 11/30* (2014.01)
*B41J 2/165* (2006.01)

(52) U.S. Cl.
CPC ............ *C08K5/3415* (2013.01); *C09D 11/033* (2013.01); *C09D 11/30* (2013.01); *C09D 11/322* (2013.01); *C09D 11/38* (2013.01); *C09D 125/14* (2013.01); *B41J 2/1652* (2013.01); *B41J 2/16508* (2013.01); *B41J 2/16538* (2013.01); *B41J 2202/00* (2013.01)

(56) References Cited

U.S. PATENT DOCUMENTS

| | | | |
|---|---|---|---|
| 8,080,291 | B2 | 12/2011 | Tanaka et al. |
| 8,388,125 | B2 | 3/2013 | Okubo et al. |
| 2003/0081086 | A1 | 5/2003 | Suzuki et al. |
| 2008/0084463 | A1* | 4/2008 | Kawase ................. 347/89 |
| 2009/0238977 | A1 | 9/2009 | Kawabe et al. |
| 2009/0274840 | A1 | 11/2009 | Yamakami et al. |
| 2010/0033522 | A1* | 2/2010 | Saito et al. ............. 347/9 |
| 2010/0097433 | A1* | 4/2010 | Mukai et al. ............ 347/93 |
| 2010/0168322 | A1 | 7/2010 | Ikoshi et al. |
| 2014/0313265 | A1 | 10/2014 | Himura et al. |

FOREIGN PATENT DOCUMENTS

| | | |
|---|---|---|
| EP | 2 333 023 A1 | 6/2011 |
| EP | 2 568 017 A2 | 3/2013 |
| JP | 61-157566 A | 7/1986 |
| JP | 2003-138186 A | 5/2003 |
| JP | 2004209762 A * | 7/2004 |
| JP | 2009-256602 A | 11/2009 |
| JP | 2011174007 A * | 9/2011 |
| JP | 2011-195826 A | 10/2011 |
| JP | 2012-031350 A | 2/2012 |
| JP | 4956917 B2 | 6/2012 |
| JP | 2013-014111 A | 1/2013 |

OTHER PUBLICATIONS

Canon: "LX-P5500 Technical specifications", Apr. 2013, pp. 1-3, XP055161561 (retrieved from the Internet).
Canon: "LX-D5500 Technical specifications", Jul. 2013, pp. 1-3, XP055161555 (retrieved from the Internet).

* cited by examiner

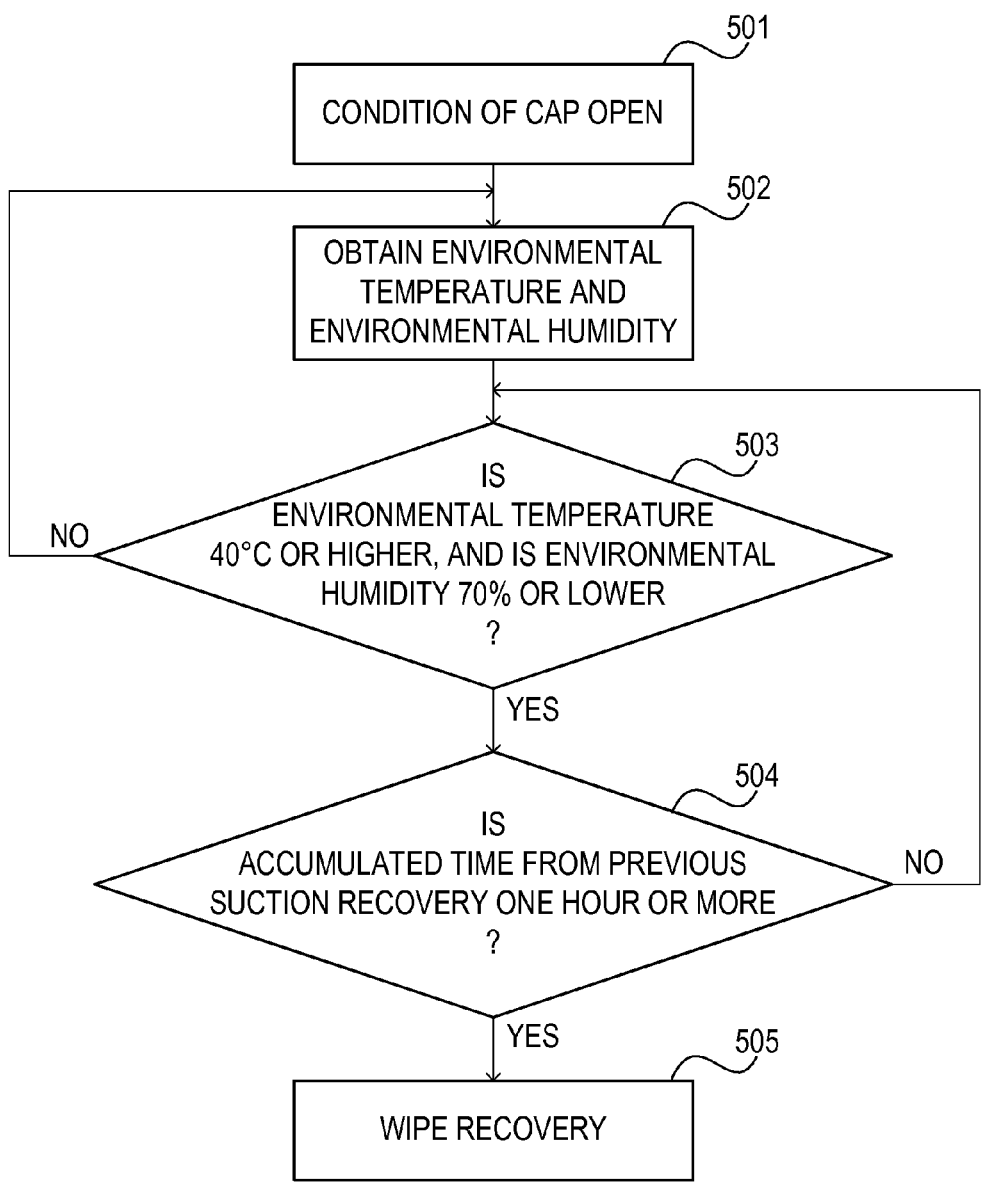

INK JET RECORDING INK, INK JET RECORDING METHOD, INK JET RECORDING HEAD, AND INK JET RECORDING APPARATUS

BACKGROUND OF THE INVENTION

1. Field of the Invention

The present invention relates to an ink jet recording ink, and to an ink jet recording method, an ink jet recording head, and an ink jet recording apparatus using the ink jet recording ink. In particular, the present invention relates to a technology suitable for ink jet recording of a thermal system, and among others, a technology effective when applied to a line type recording head.

2. Description of the Related Art

Ink jet recording apparatus have advantages in their low noise, low running cost, easiness of downsizing, easiness of small-lot full-color printing, and the like, and are currently widely applied not only to a printer but also to a copying machine, a printing machine, and the like. The ink jet recording apparatus are widely used for home use, for business use, and for industrial use.

As a recording system for the ink jet recording apparatus, a thermal system and a piezoelectric system are known. Among others, the thermal system, in which ink is ejected by generating an air bubble in ink in a nozzle through heating, has advantages in a relatively simple head structure, high printing speed, high density of print pixels, and the like. Further, a structure of an ink jet recording head (also referred to as a recording head or simply referred to as a head) has also been progressed. In addition to a related-art serial system, in which printing is carried out by horizontally reciprocating the head while a sheet is fed, a line system is becoming adopted, in which a long head corresponding to a width of a sheet is used and printing is carried out under a state in which only the sheet is fed without moving the head. In the line system, a sheet is fed under a fixed long head so that printing can be carried out in a stroke. Thus, the line system is suitable for high-speed printing and is becoming adopted in the fields of large-format printing and printers for industrial use, in which high image quality and high-speed printing are required.

In the ink jet recording method of the thermal system, water evaporates from the ink in the nozzle when heated to increase the viscosity of the ink, which may cause nozzle clogging and sticking of the ink to the head. Thus, there is a problem in that an image defect is liable to be caused due to ejection failure of the ink, dot misalignment, or the like. On the other hand, in the above-mentioned serial system, the inside of the nozzle is always kept in a fresh state by operation of ejecting, toward a cap, ink in the nozzle that is thickened by evaporation (preparatory ejection) every time a scan ends. However, in the case of the line system, the head is fixed, and thus, recovery operation such as the preparatory ejection that is carried out in the serial system cannot be carried out. When nozzle clogging or ink sticking is caused in a head of the line system, it is necessary to stop the printing and recover the state of the head so that ink is normally ejected from a nozzle array. In the case of the head of the line system, when the recovery operation of the head is frequently carried out, the printing needs to be stopped every time the recovery operation is carried out, which reduces productivity. Further, when the ink firmly sticks, even a head of the serial system cannot easily recover by cleaning operation such as preparatory ejection, and thus, it is demanded that a head to which ink sticks be able to recover a normal condition by simple cleaning operation.

In view of the circumstances described above, particularly in ink jet recording using a head of the line system (hereinafter also referred to as a line type head), in order to stably print a satisfactory image without an image defect such as ejection failure or dot misalignment, and without reduction in productivity, ink jet recording ink to be used is required not to cause the image defect due to nozzle clogging even when the ink is exposed to the air.

On the other hand, as a method of inhibiting the nozzle clogging with the ink jet recording ink, use of ink containing no water, such as oil-based ink or solid ink, is conceived. However, from the viewpoint of safety, influence on the environment, and energy saving, aqueous ink is more demanded. Therefore, in the aqueous ink jet recording ink, to inhibit the nozzle clogging, various kinds of proposals have been made thus far as described below.

As the aqueous ink jet recording ink that suppresses clogging of an ejection orifice of a nozzle, for example, an ink characterized by containing ethylene urea and a self-dispersed pigment having a phosphonate group with a modified surface as a functional group has been proposed (Japanese Patent Application Laid-Open No. 2012-31350). Japanese Patent Application Laid-Open No. 2012-31350 describes that the ink jet recording ink having the above-mentioned structure achieves both of the reliability that retention of the ink in a cap for covering the recording head is inhibited and thus the sticking recovery property of the ink in the recording head is excellent and the image characteristic that an image excellent in image density and bleeding resistance can be recorded.

Further, as an aqueous ink jet recording ink that suppresses clogging of an ejection orifice, a recording liquid (ink) characterized by having a water activity (Aw) of 0.70 to 0.90 has been proposed (Japanese Patent Application Laid-Open No. S61-157566). Japanese Patent Application Laid-Open No. S61-157566 describes that, in the above-mentioned structure, a solid content is less liable to be precipitated out of the ink and the ink is less liable to change the physical properties thereof during storage of the ink, and that nozzle clogging is less liable to occur.

Further, an aqueous ink jet recording ink has been proposed, which contains a water-soluble compound exhibiting a hydrophilicity-hydrophobicity coefficient of 0.26 or more as determined by the water activity value thereof, and has defined therein the total amount of an anionic functional group of a self-dispersed pigment and an amount of cesium ions contained in the ink (Japanese Patent Application Laid-Open No. 2011-195826). Japanese Patent Application Laid-Open No. 2011-195826 describes that, in the above-mentioned structure, while the ink is promptly permeated in plain paper, an obtained image has a high optical density, and further, nozzle clogging is inhibited.

However, detailed studies conducted by the inventors of the present invention have revealed that, in the technologies described in Japanese Patent Application Laid-Open Nos. 2012-31350, S61-157566, and 2011-195826, particularly when the line type head carries out printing at high speed in the ink jet recording of the thermal system, evaporation of ink in the vicinity of the nozzle may proceed excessively to cause nozzle clogging with ink. As described above, when an image defect such as ink ejection failure or dot misalignment is caused due to clogging with ink, in the line type head, it is necessary to stop the printing and recover the state of the head so that ink is normally ejected from a nozzle array, and thus, inhibition of clogging with ink is particularly an important subject. Further, demand for higher image quality in ink jet recording in recent years reduces the size of an ink droplet to be ejected so that the opening area of a nozzle tends to be reduced. In terms of this point as well, inhibition of nozzle clogging is an important subject to be addressed. Still further, there has been a demand to develop ink with excellent resolubility and sticking recovery property, which can inhibit sticking thereof to a head and, even when sticking thereof to the head is caused, allows the head to promptly recover a normal condition by simple recovery operation irrespective of the structure of the head.

The above-mentioned problem of clogging with ink is more significant when pigment ink using a pigment as a coloring material is used compared with a case of ink using a dye as a coloring material. Particularly when a resin-dispersed pigment in which a pigment is dispersed in aqueous ink by a polymeric dispersant is used as a coloring material, clogging with ink tends to occur. Particularly in the ink jet recording ink of the thermal system, a block copolymer including a hydrophobic block and a hydrophilic block is hitherto used as a polymeric dispersant for dispersing a pigment, and by using such a block copolymer for dispersing a pigment, ink ejection stability and storage stability are attained. On the other hand, along with development of such ink for industrial use, mainly from the viewpoint of cost efficiency, studies on a polymeric dispersant to be used for dispersing a pigment have been conducted and a random copolymer is becoming available instead of a block copolymer, which is difficult to design and synthesize. However, inhibition of clogging with ink in the case where an ink in which a resin-dispersed pigment using a random copolymer as a polymeric dispersant is used as a coloring material is used in the ink jet recording of the thermal system, in particular, in the case of producing a record with the line type head, has not been fully studied partly because such ink has not been used. The inventors of the present invention have reached an acknowledgement that development of ink jet recording ink capable of stably and effectively inhibiting clogging therewith particularly in the above-mentioned case is urgently required.

SUMMARY OF THE INVENTION

In view of the above, an object of the present invention is to provide an ink having satisfactory resolubility and a sticking recovery property and capable of effectively inhibiting clogging, which is liable to be caused particularly in ink jet recording of a thermal system, even when evaporation of water in the ink proceeds. More specifically, an object of the present invention is to provide an aqueous ink jet recording ink suitable particularly for producing a record with a line type head adaptable to high speed printing, and capable of effectively inhibiting nozzle clogging and sticking of the ink in the recording head due to high resolubility thereof and, at the same time, even when the ink sticks to the head, allowing the head to promptly recover a normal condition by simple cleaning operation due to the high sticking recovery property thereof.

The above-mentioned object is attained by an ink jet recording ink, an ink jet recording method, an ink jet recording head, and an ink jet recording apparatus according to the present invention, which have the following structures, respectively.

[1] Ink Jet Recording Ink:

According to an embodiment of the present invention, there is provided an ink jet recording ink, including a pigment; water; and water-soluble compounds, in which the pigment includes a resin-dispersed pigment dispersed with a (meth)acrylate-based random copolymer having an acid value of 100 mgKOH/g or more and 160 mgKOH/g or less, in which the water-soluble compounds include at least ethylene urea and a water-soluble compound having a hydrophilicity-hydrophobicity coefficient defined by the following equation (A) of 0.37 or less, in which a total content of the water-soluble compounds is 22 mass % or more and 50 mass % or less with respect to a total amount of the ink, and in which a content of the ethylene urea is 11.0 mass % or more with respect to the total amount of the ink, and a proportion of an amount of the ethylene urea in a total amount of the water-soluble compounds is 50% by mass or less.

$$\text{Hydrophilicity-hydrophobicity coefficient} = ((\text{water activity value of 20\% aqueous solution}) - (\text{molar fraction of water in 20\% aqueous solution}))/(1 - (\text{molar fraction of water in 20\% aqueous solution})) \quad \text{Equation (A)}$$

[2] Ink Jet Recording Method:

According to an embodiment of the present invention, there is provided an ink jet recording method including ejecting ink from a nozzle array using a thermal system to conduct recording, in which each nozzle of the nozzle array has an opening area of from 100 µm² to 350 µm², and in which the ink is the ink described above.

Further, according to an embodiment of the present invention, there is provided an ink jet recording method including ejecting ink from a nozzle array using a thermal system to conduct recording, in which a total number of nozzles per the nozzle array is 1,200 or more, in which a length of the nozzle array is 2 inches or more, and in which the ink is the ink described above.

[3] Ink Jet Head:

According to an embodiment of the present invention, there is provided an ink jet recording head having ink stored therein for ejecting the ink from a nozzle array using a thermal system, in which each nozzle of the nozzle array has an opening area of from 100 µm² to 350 µm², in which a total number of nozzles per the nozzle array is 1,200 or more, in which a length of the nozzle array is 2 inches or more, and in which the stored ink is the ink described above.

Further, according to an embodiment of the present invention, there is provided an ink jet recording head having ink stored therein for ejecting the ink from a nozzle array using a thermal system, the ink jet recording head including a common liquid chamber communicating with a plurality of nozzle flow paths serving as the nozzle array; an opening portion communicating with the common liquid chamber; a main liquid supply chamber communicating with the opening portion; a liquid supply path communicating with the main liquid supply chamber; a liquid supply chamber communicating with the liquid supply path; a supply filter provided so as to partition the liquid supply chamber into a first liquid supply chamber and a second liquid supply chamber from an upstream side along a flow during supply of liquid; a gas-liquid separation portion provided in part of the main liquid supply chamber; and an air chamber communicating with the gas-liquid separation portion, the plurality of nozzle flow paths, the common liquid chamber, the opening portion, the main liquid supply chamber, the liquid supply path, the liquid supply chamber, the supply filter, the gas-liquid separation portion, and the air chamber being disposed on a plane parallel to a plane including an arrangement direction of the plurality of nozzle flow paths and an ejection direction of the liquid, the main liquid supply chamber, the liquid supply path, the supply filter, the gas-liquid separation portion, and the air chamber being disposed without being laminated respectively, the stored ink being the ink described above.

[4] Ink Jet Recording Apparatus:

According to an embodiment of the present invention, there is provided an ink jet recording apparatus, including an ink storage portion; and a recording head for ejecting ink, in which the ink storage portion stores the ink described above, and in which the recording head is any one of the ink jet recording heads described above.

According to the present invention, it is possible to provide an ink having satisfactory resolubility and a sticking recovery property and capable of effectively inhibiting the clogging, which is liable to be caused particularly in ink jet recording of a thermal system, even after the evaporation of the water in the ink. More specifically, according to the present invention, it is possible to provide an aqueous ink jet recording ink capable of obtaining remarkable effects particularly when applied to a head of a line system having high resolution and adaptable to high speed printing, effectively inhibiting the nozzle clogging and the sticking of the ink in the recording head due to high resolubility thereof and, at the same time, even when the ink sticks to the head, allowing the head to promptly recover the normal condition by simple cleaning operation due to the high sticking recovery property thereof.

Further features of the present invention will become apparent from the following description of exemplary embodiments with reference to the attached drawings.

BRIEF DESCRIPTION OF THE DRAWINGS

FIG. 8 is a flow chart illustrating steps of a recovery sequence of the recording head.

DESCRIPTION OF THE EMBODIMENTS

Figure 1A:
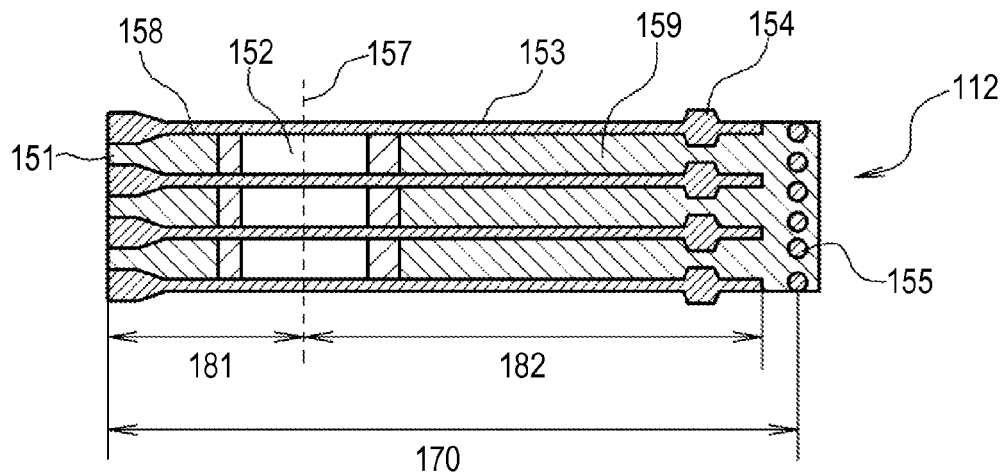
FIG. 1A is a top view schematically illustrating an internal structure of nozzles of a recording head.

Preferred embodiments of the present invention will now be described in detail in accordance with the accompanying drawings.

Now, the present invention is described in detail. However, the present invention is not limited to the following embodiments and comprehends all objects having matters to define the invention. Note that, the term "recording" as used herein comprehends not only the case where meaningful information such as a letter, a figure, or a symbol is formed on a recording medium but also the case where an image, design, pattern, or the like having no particular meaning is formed thereon.

As a result of extensive studies conducted by the inventors of the present invention for solving the above-mentioned problems in the prior art, it has been found that, by improving the design of ink composition useful for an ink in which a resin-dispersed pigment is used as a coloring material, in particular, for an ink jet recording ink of a thermal system, and among others, by improving the composition of a water-soluble compound contained therein, ink jet recording ink can be provided, which is particularly effective when recording is conducted using a line type head, in which recovery operation cannot be carried out frequently because the recovery operation involves stoppage of printing. Thus, the inventors of the present invention have reached the present invention. Specifically, according to the present invention, by improving the composition of the water-soluble compound contained in the ink, ink jet recording ink (hereinafter also simply referred to as ink) with satisfactory resolubility and a sticking recovery property is provided, which can significantly improve inhibition of clogging with the ink and, at the same time, allows the recording head to promptly recover a normal condition by simple cleaning operation even when the ink sticks to the head.

The reason why the inventors have reached the present invention is described below. As described in the foregoing, for example, the technology described in Japanese Patent Application Laid-Open No. 2012-31350 is a technology involving using, as a coloring material, a self-dispersible pigment whose dispersibility has been improved by modifying the pigment itself, and the technology cannot be applied as it is to an ink using a resin-dispersed pigment, in particular, using, as a dispersant, a random copolymer with which it is hard to obtain stable dispersibility as compared with a block copolymer. In addition, the ink having a water activity (Aw) of from 0.70 to 0.90 described in Japanese Patent Application Laid-Open No. S61-157566 is said to hardly cause the clogging of a nozzle. According to a study made by the inventors of the present invention, however, the problem of the clogging of the nozzle may not be alleviated even with such ink, and it is difficult to stably suppress the clogging of the nozzle particularly in ink jet recording of a thermal system involving using a line-type head. Further, in the above-mentioned case as well, no detailed study has been made on means for suppressing the occurrence of the clogging of the ink when the dispersant of the resin-dispersed pigment to be used as a coloring material is a random copolymer. In view of such circumstances, as described in the foregoing, printing needs to be stopped for a nozzle recovery operation particularly in the ink jet recording involving using the line-type head, and hence the inventors of the present invention have acknowledged that the development of the following aqueous pigment ink is urgent: even in such case as described above, the ink can stably suppress the clogging of the ink with reliability, does not cause an image defect resulting from the clogging of the ink such as the dot misalignment of an image, and can stably form a good image. Thus, the inventors have made a detailed study and have achieved the present invention.

The inventors of the present invention have considered that particularly in an aqueous pigment ink using, as a coloring material, a resin-dispersed pigment using a random copolymer, which is inferior in dispersion stability to a block copolymer, as a dispersant, it is important to additionally improve the dispersion stability of the pigment in the ink for suppressing the occurrence of the clogging of the ink and its sticking to a head. Thus, the inventors have made a detailed study on a water-soluble compound that largely affects the dispersion stability. In the process of the study, the inventors of the present invention have found that particularly in the ink jet recording of the thermal system, water in an ink evaporates in a head upon ejection of the ink to bring the ink into a concentrated state, which is responsible for the occurrence of the clogging or sticking of the ink in the nozzle. Accordingly, the inventors considered that the problems can be solved at one stroke when the concentrated ink brought into such state can be quickly redissolved by an ink newly transferred to the nozzle. As a result, the inventors of the present invention have found the following: a water-soluble compound having a hydrophilicity-hydrophobicity coefficient of 0.37 or less is useful as a water-soluble compound to be used together with water, but in the case, an increase in amount of such water-soluble compound involves a problem in that a solvent shock occurs; in contrast, adopting a structure specified in the present invention provides a balanced ink that can realize good and stable ink ejection, effectively suppresses the occurrence of the clogging of the ink, and is excellent in resolubility and the sticking recovery property. Thus, the inventors have reached the present invention.

An ink of the present invention is as follows: the content of water-soluble compounds in the aqueous pigment ink is set to 22 mass % or more and 50 mass % or less with respect to the total amount of the ink, such a constitution that a water-soluble compound having a hydrophilicity-hydrophobicity coefficient of 0.37 or less and solid ethylene urea are used in combination is adopted for the water-soluble compounds to be used, the ethylene urea is used in an amount of 11.0 mass % or more with respect to the total amount of the ink, and the proportion of the amount of the ethylene urea in the total amount of the water-soluble compounds is 50% by mass or less. Specifically, the water-soluble compound having a hydrophilicity-hydrophobicity coefficient of 0.37 or less specified in the present invention is, for example, glycerin, but an increase in content of glycerin has involved a problem in that the ink thickens and hence the ejection property of the ink is impaired. To cope with the problem, the inventors have confirmed that the combined use of the ethylene urea can increase the content of the water-soluble compounds in the ink. That is, when the water-soluble compound having a hydrophilicity-hydrophobicity coefficient of 0.37 or less and the ethylene urea are used in combination, the water-soluble compounds can be incorporated at a content in the range of from 22 mass % or more to 50 mass % or less with respect to the total amount of the ink without the occurrence of a solvent shock.

Further, the inventors have found that: when the ethylene urea is incorporated into the ink in an amount in such a range that the conditions specified in the present invention are satisfied as described above, the ink hardly evaporates and dried ink after the evaporation of water in the ink has viscosity; when the dried ink is mixed with a new ink, the dried ink is quickly redissolved in a good state free of a deposit; and even when the ink sticks to a head, the ejection condition of the head is quickly recovered to a good one by a simple cleaning operation. Thus, the inventors have reached the present invention. Specifically, the ink of the present invention is characterized by being designed so that while the solid ethylene urea needs to be incorporated in an amount of 11.0 mass % or more with respect to the total amount of the ink because of a tradeoff with the water-soluble compound having a hydrophilicity-hydrophobicity coefficient of 0.37 or less to be used in combination, the proportion of the amount of the ethylene urea in the total amount of the water-soluble compounds is 50% by mass or less. When the proportion of the amount of the ethylene urea in the total amount of the water-soluble compounds exceeds 50%, dried ink dissolves in the case where the dried ink is mixed with a new ink. However, such a state that the ethylene urea is deposited is established and hence the ejection stability of the ink is impaired. The constitution of the ink characterizing the present invention is described below.

[1] Ink Jet Recording Ink:

An ink jet recording ink (hereinafter simply referred to as "ink") of the present invention contains a pigment, water, and water-soluble compounds as essential components, the pigment is a resin-dispersed pigment dispersed with a (meth) acrylate-based random copolymer having an acid value of 100 mgKOH/g or more and 160 mgKOH/g or less, a production method for the ink is based on an ordinary method, and the ink can be obtained by, for example, a method disclosed in Japanese Patent No. 4,956,917. In addition, the water-soluble compounds include at least ethylene urea and a water-soluble compound having a hydrophilicity-hydrophobicity coefficient defined by the following equation (A) of 0.37 or less. The ink of the present invention may contain a water-soluble compound having a hydrophilicity-hydrophobicity coefficient of 0.37 or more, a surfactant, or any other solvent or additive as required. Each component is described below.

[1-1] Water-Soluble Compound:

The ink of the present invention contains the ethylene urea and the water-soluble compound having a hydrophilicity-hydrophobicity coefficient defined by the following equation (A) of 0.37 or less as essential components.

$$\text{Hydrophilicity-hydrophobicity coefficient} = ((\text{water activity value of 20\% aqueous solution}) - (\text{molar fraction of water of 20\% aqueous solution}))/(1 - (\text{molar fraction of water of 20\% aqueous solution}))$$

Equation (A)

The water activity value in the equation (A) is represented by the equation "water activity value=(water vapor pressure of aqueous solution)/(water vapor pressure of pure water)." Various methods are available as a method of measuring the water activity value, and the measurement method is not limited to any one of the methods. Of those, a chilled mirror dew point-measuring method is suitable for measurement for a material to be used in the present invention. A value in the specification is obtained by subjecting a 20% aqueous solution of each water-soluble compound to measurement with an AquaLab CX-3TE (manufactured by DECAGON) based on the measurement method at 25° C.

According to Raoult's law, the decreasing rate of the vapor pressure of a dilute solution is equal to the molar fraction of its solute, and is independent of the kinds of its solvent and solute, and hence the molar fraction of water in the aqueous solution and its water activity value are equal to each other. However, when the water activity values of aqueous solutions of various water-soluble compounds are measured, the water activity values of many of the aqueous solutions do not coincide with the molar fractions of water.

When the water activity value of an aqueous solution is lower than the molar fraction of water, the water vapor pressure of the aqueous solution is smaller than a theoretically calculated value, i.e., the evaporation of water is suppressed by the presence of a solute. It is understood from the foregoing that the solute is a substance having a large hydration force. In contrast, when the water activity value of the aqueous solution is higher than the molar fraction of water, the solute is considered to be a substance having a small hydration force.

Although the water activity values of the aqueous solutions of various water-soluble compounds are measured at a uniform concentration of 20 mass %, the degrees of hydrophilicity or hydrophobicity of various solutes can be relatively compared, even when the molecular weights of the solutes are different and the molar fractions of water are different, through conversion with the equation (A). In addition, the maximum of a hydrophilicity-hydrophobicity coefficient is 1 because the water activity value of an aqueous solution does not exceed 1. Table 1 shows the hydrophilicity-hydrophobicity coefficients of various water-soluble compounds obtained by using the equation (A). A water-soluble compound having a target hydrophilicity-hydrophobicity coefficient, which is selected from various water-soluble compounds having suitability as an ink jet recording ink, can be used as a water-soluble compound to be used in the present invention. For example, any water-soluble compound having a hydrophilicity-hydrophobicity coefficient of 0.37 or less out of those listed in Table 1 can be used in the ink of the present invention, but the present invention is not limited to the compounds in Table 1. Water-soluble compounds particularly preferred for the ink of the present invention are, for example, glycerin, triethylene glycol, and bishydroxyethyl sulfone.

TABLE 1

Characteristics of water-soluble compounds

| Substance name | Hydrophilicity-hydrophobicity coefficient | Solubility (g/100 g-$H_2O$) |
| --- | --- | --- |
| 1,2-Hexanediol | 0.97 | 20< |
| 1,2-Pentanediol | 0.93 | 20< |
| 3-Methyl-1,3-butanediol | 0.90 | 20< |
| 1,2-Butanediol | 0.90 | 20< |
| 2,4-Pentanediol | 0.86 | 20< |
| 1,6-Hexanediol | 0.76 | 20< |
| 1,7-Heptanediol | 0.73 | 20< |
| 3-Methyl-1,5-Pentanediol | 0.54 | 20< |
| 1,5-Pentanediol | 0.41 | 20< |
| Trimethylolpropane | 0.31 | 20< |
| Ethylene urea | 0.30 | 20< |
| 1,2,6-Hexanetriol | 0.28 | 20< |
| 1,2,3-Butanetriol | 0.22 | 20< |
| Sorbitol | 0.21 | 20< |
| Urea | 0.20 | 20< |
| Diethylene glycol | 0.15 | 20< |
| 1,2,4-Butanetriol | 0.15 | 20< |
| Glycerin | 0.11 | 20< |
| Diglycerin | 0.08 | 20< |
| Triethylene glycol | 0.07 | 20< |
| Polyethylene glycol 200 | −0.09 | 20< |
| Bishydroxyethyl sulfone | 0.21 | 20< |
| Polyethylene glycol 600 | −0.43 | 20< |

As described in the foregoing, the inventors of the present invention have found that when any such water-soluble compound having a hydrophilicity-hydrophobicity coefficient of 0.37 or less as listed above and ethylene urea are used in combination, and the contents thereof are set to fall within ranges specified in the present invention, the ink becomes an ink that hardly evaporates, has a good moisture-retaining property even after drying, and has good resolubility and a sticking recovery property of a dried ink, and thus have achieved the present invention.

[1-2] Coloring Material:

The coloring material of the ink of the present invention is obtained by dispersing a pigment in an aqueous medium. In addition, the coloring material is of the type called pigment-resin dispersion (resin-dispersed pigment), especially a coloring material obtained by causing a (meth)acrylate-based random copolymer having an acid value of 100 mgKOH/g or more and 160 mgKOH/g or less to adsorb to the pigment; and dispersing the resultant in the aqueous medium. A production method for the coloring material is based on an ordinary method, and the coloring material can be obtained by, for example, a method disclosed in Japanese Patent No. 4,956,917.

[1-2A] Pigment:

Examples of the pigment related to the present invention include carbon black and an organic pigment. One kind of those pigments may be used, or two or more kinds thereof may be used in combination.

Specific examples of the carbon black include carbon black pigments such as furnace black, lamp black, acetylene black, and channel black. There may be used, for example, a carbon black pigment having a brand name such as Raven (manufactured by Columbian Chemicals Co.), Black Pearls L, Regal, Mogul L, Monarch, or Valcan (manufactured by Cabot Corporation), Color Black, Printex, or Special Black (manufactured by Degussa), or Mitsubishi Carbon Black (manufactured by Mitsubishi Chemical Corporation) as a trade name. It should be appreciated that the carbon black is not limited thereto, and conventionally known carbon black may also be used. In terms of physical properties, the carbon black to be used in the present invention is preferably a carbon black having a primary particle diameter of 10 nm or more and 40 nm or less, a specific surface area based on a BET method of from 50 to 400 $m^2/g$ or less, a DBP oil absorption of from 40 to 200 ml/100 g or less, a volatile content of from 0.5 to 10%, and a pH of from 2 to 9. The carbon black having such characteristics acts on the effects of the present invention in a particularly effective manner. Note that the DBP oil absorption is measured by JIS K 6221 A method.

Specific examples of the organic pigment may include insoluble azo pigments such as toluidine red, toluidine maroon, hansa yellow, benzidine yellow, and pyrazolone red; soluble azo pigments such as lithol red, helio bordeaux, pigment scarlet, and permanent red 2B; derivatives of a vat dyestuff such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; thioindigo-based pigments; condensed azo-based pigments; and other pigments such as flavanthrone yellow, acylamide yellow, quinophthalone yellow, nickel azo yellow, copper azomethine yellow, perinone orange, anthrone orange, dianthraquinonyl red, and dioxazine violet.

In addition, examples of the organic pigment indicated by a color index (C.I.) number may include the following pigments. It should be understood that in addition to the following, a conventionally known organic pigment may be used.

C.I. Pigment Yellow: 12, 13, 14, 17, 20, 24, 74, 83, 86, 93, 109, 110, 117, 120, 125, 128, 137, 138, 147, 148, 151, 153, 154, 166, and 168

C.I. Pigment Orange: 16, 36, 43, 51, 55, 59, and 61

C.I. Pigment Red: 9, 48, 49, 52, 53, 57, 97, 122, 123, 149, 168, 175, 176, 177, 180, 192, 215, 216, 217, 220, 223, 224, 226, 227, 228, 238, and 240

C.I. Pigment Violet: 19, 23, 29, 30, 37, 40, and 50

C.I. Pigment Blue: 15, 15:1, 15:3, 15:4, 15:6, 22, 60, and 64

C.I. Pigment Green: 7 and 36

C.I. Pigment Brown: 23, 25, and 26

[1-2B] Resin that Functions as Dispersant:

In the ink of the present invention, a resin-dispersed pigment dispersed with a (meth)acrylate-based random copolymer is used as the coloring material. In the present invention, a (meth)acrylate-based copolymer, which is more preferred from the viewpoint of ejection property, is used as a dispersant. The (meth)acrylate-based copolymer to be used in the present invention can be obtained by copolymerizing (meth) acrylic acid, a (meth)acrylate, and a monoethylenically unsaturated monomer copolymerizable with the foregoing. (Meth) acrylic acid comprehends acrylic acid and methacrylic acid. Of those, methacrylic acid is preferably used in consideration of its nature that the range in which its electrically neutral state and its anion state coexist can be widely controlled. Note that, examples of the (meth)acrylate-based copolymer include ones having a random structure, a block structure, and a graft structure, but of those, a random copolymer is used in the present invention. This is because a copolymer except the random copolymer, for example, the block copolymer involves another problem. That is, the hydrophilicity of the pigment is often high and hence a formed printed image is often poor in water resistance.

[1-2B-1] Monomer Component for Producing Resin:

(Meth)acrylic acid comprehends acrylic acid and methacrylic acid. Of those, methacrylic acid is preferred in consideration of the nature that the range in which its electrically neutral state and its anion state coexist can be widely controlled, its easy availability, its price, and the like. Examples of the (meth)acrylate include: alkyl(meth)acrylates such as methyl(meth)acrylate, n-butyl(meth)acrylate, 2-ethylhexyl (meth)acrylate, n-octyl(meth)acrylate, dodecyl(meth)acrylate, octadecyl(meth)acrylate, cyclohexyl(meth)acrylate, and isobornyl(meth)acrylate; hydroxyalkyl(meth)acrylates such as 2-hydroxyethyl(meth)acrylate, 2-hydroxypropyl(meth) acrylate, and 3-hydroxypropyl(meth)acrylate; alkylene glycol mono(meth)acrylates such as diethylene glycol mono (meth)acrylate, triethylene glycol mono(meth)acrylate, polyethylene glycol mono(meth)acrylate, propylene glycol mono(meth)acrylate, dipropylene glycol mono(meth)acrylate, tripropylene glycol mono(meth)acrylate, tetramethylene ether glycol mono(meth)acrylate, a mono(meth)acrylate of random polymer glycol or block polymer glycol of polyethylene oxide-polypropylene oxide, and a mono(meth)acrylate of random polymer glycol or block polymer glycol of polyethylene oxide-polytetramethylene ether; glycidyl(meth) acrylate; and benzyl(meth)acrylate.

In addition to the (meth)acrylic acid, (meth)acrylate, and monoethylenically unsaturated monomer, a styrene-based monomer may also be incorporated into the (meth)acrylate-based copolymer to be used in the ink of the present invention. Herein, examples of the styrene-based monomer include styrene, α-methylstyrene, o-methylstyrene, m-methylstyrene, p-methylstyrene, p-t-butylstyrene, 4-methoxystyrene, and 4-chlorostyrene. That is, the (meth)acrylate copolymer is preferably a styrene-(meth)acrylic acid-based copolymer containing a styrene-based monomer.

[1-2B-2] Characteristics of Resin:

A copolymer having an acid value of 100 mgKOH/g or more and 160 mgKOH/g or less is used as the (meth)acrylate-based copolymer, which is synthesized from the monomers as described above, to be used in the ink of the present invention. A copolymer having an acid value of 110 mgKOH/g or more and 150 mgKOH/g or less is more preferably used. When the acid value exceeds 160 mgKOH/g, the hydrophilicity of the pigment is high and hence the pigment begins to dissolve owing to the attachment of water or the like to be liable to cause the bleeding of a printed article. In addition, when the acid value is less than 100 mgKOH/g, the ejection stability of an aqueous pigment ink in the thermal system of an ink jet printer tends to reduce. Here, the acid value refers to the amount (mg) of KOH needed for neutralizing 1 g of the resin and can be an indicator representing its hydrophilicity. Although the acid value in this case can be determined by calculation from the composition ratio of the respective monomers constituting the resin dispersant, the acid value of the resin-dispersed pigment can be measured by, for example, a measuring method involving using a Titrino (manufactured by Metrohm) that determines the acid value through potentiometric titration.

The weight-average molecular weight (Mw) of the (meth) acrylate-based copolymer to be used in the ink of the present invention in terms of styrene preferably falls within the range of from 6,000 to 12,000, and more preferably falls within the range of from 7,000 to 9,000. When the weight-average molecular weight is set to fall within this range, the dispersion stability of the resin-dispersed pigment is improved, its viscosity can be set to a low value, kogation in a heater portion is suppressed, and printing can be stably performed for a long time period. The case where the weight-average molecular weight is less than 6,000 is not preferred because the dispersion stability of the aqueous resin-dispersed pigment itself reduces. In addition, the case where the weight-average molecular weight exceeds 12,000 is not preferred because the following tendency is observed: the viscosity of the aqueous resin-dispersed pigment increases and its dispersibility reduces. Further, this case is not preferred because the kogation in the heater portion worsens, which is responsible for the occurrence of the ejection failure of an ink droplet from the tip of a nozzle of an ink jet printer of a thermal system.

[1-2B-3] Amount of Resin with Respect to Pigment:

The above-mentioned resin-dispersed pigment is applied to the coloring material in the ink of the present invention. In this case, the ratio of the (meth)acrylate-based copolymer to the pigment is preferably adjusted as follows from the viewpoints of maintaining the dispersibility of a dispersion and maintaining the viscosity of the pigment ink at a low value: the amount of the (meth)acrylate-based copolymer falls within the range of from 0.2 to 1.0 part by mass with respect to 1 part by mass of the pigment in terms of mass.

[1-2C-1] Resin-Dispersed Pigment:

The resin-dispersed pigment to be used in the ink of the present invention can be prepared by, for example, coating any one of the pigments listed in the foregoing with such (meth)acrylate-based polymer as described above. With regard to the average particle diameter of the resin-dispersed pigment to be used in the present invention, the value determined by a dynamic light scattering method in a liquid is preferably 70 nm or more and 150 nm or less, more preferably 80 nm or more and 120 nm or less. A particle diameter in excess of 150 nm is not preferred because the sedimentation of the ink is promoted and hence the long-term dispersion stability of the pigment is impaired. On the other hand, a particle diameter of less than 70 nm is not preferred because color developability sufficient for the formation of an image or sufficient weatherability of the resultant image cannot be obtained. The average particle diameter can be measured by, for example, a measuring method involving using an FPAR-1000 (manufactured by Otsuka Electronics Co., Ltd., analysis by a cumulant method) or Nanotrac UPA 150EX (manufactured by NIKKISO CO., LTD., a 50% integrated value is adopted) utilizing the scattering of laser light.

The addition amount of the resin-dispersed pigment in the ink is preferably 0.5 mass % or more and 10 mass % or less, more preferably 1.0 mass % or more and 8.0 mass % or less, still more preferably 1.5 mass % or more and 6.0 mass % or less with respect to the total amount of the ink. A pigment concentration of less than 0.5 mass % is not preferred because color developability sufficient for the formation of an image cannot be obtained. In addition, a pigment concentration in excess of 10.0 mass % is not preferred because the viscosity of the aqueous pigment ink increases and hence it becomes difficult to eject the ink.

[1-2C-2] Production Method:

A resin-dispersed pigment as described above is used in the coloring material in the ink of the present invention, and the resin-dispersed pigment can be obtained by the following production method. For example, an acid precipitation step is preferably incorporated as a method of covering the pigment with the (meth)acrylate-based polymer into the production method. The acid precipitation step to be performed at this time is to acidify a liquid medium containing the pigment and the (meth)acrylate-based copolymer dissolved in an aqueous solution of a basic substance through the addition of an acidic substance to return an anionic group in the (meth)acrylate-based copolymer to a functional group before neutralization, thereby precipitating the polymer.

The acid precipitation step to be performed at this time is specifically, for example, the step of acidifying an aqueous dispersion, which has been obtained through a dispersion step and a distillation step to be performed as required, through the addition of an acid such as hydrochloric acid, sulfuric acid, or acetic acid to form a base and a salt, thereby precipitating the (meth)acrylate-based copolymer in a dissolved state on the surface of a pigment particle. Performing such step can additionally improve an interaction between the pigment and the (meth)acrylate-based copolymer. As a result, a form in which pigment particles are dispersed in an aqueous dispersion medium can be established, and the aqueous resin-dispersed pigment can be caused to sufficiently exhibit additionally excellent effects in terms of physical properties such as the level final dispersion, the time period needed for the dispersion, and the dispersion stability; and use suitability such as solvent resistance. An aqueous resin-dispersed pigment additionally excellent in dispersion stability can be obtained by performing a filtration step of separating a precipitate obtained to have improved interaction by filtration; more preferably performing a washing step of washing the precipitate after the completion of the filtration step to remove a free polymer present in the resin-dispersed pigment without adsorbing thereto; and performing a redispersion step of dispersing the remainder in the aqueous medium together with the basic substance again.

[1-3] Surfactant:

In the present invention, a surfactant may be further incorporated into the ink including the above-mentioned components as required for the purposes of controlling the surface tension of the ink to be described later to arbitrarily control the bleeding degree or permeability of the ink in a recording medium or to improve the wettability of the ink in a head; and preventing the kogation of the ink on a heater surface to improve its ejection. Although such surfactant is not particularly limited, examples thereof may include the following surfactants. Note that, one kind of those surfactants may be used alone, or two or more kinds thereof may be used in combination.

Nonionic Surfactant

A polyoxyethylene alkyl ether, a polyoxyethylene fatty acid ester, a polyoxyethylene alkylphenyl ether, a polyoxyethylene-polyoxypropylene block copolymer, and the like. A fatty acid diethanolamide, an acetylene glycol ethylene oxide adduct, an acetylene glycol-based surfactant, and the like.

Anionic Surfactant

A polyoxyethylene alkyl ether sulfuric acid ester salt, a polyoxyethylene alkyl ether sulfonic acid salt, a polyoxyethylene alkylphenyl ether sulfuric acid ester salt, a polyoxyethylene alkylphenyl ether sulfonic acid salt, and the like. An α-sulfofatty acid ester salt, an alkylbenzenesulfonic acid salt, an alkylphenolsulfonic acid salt, an alkylnaphthalenesulfonic acid salt, an alkyltetralinsulfonic acid salt, a dialkylsulfosuccinic acid salt, and the like.

Cationic Surfactant

An alkyltrimethylammonium salt, a dialkyldimethylammonium chloride, and the like.

Amphoteric Surfactant

An alkylcarboxybetaine and the like.

Of those, an acetylene glycol-based surfactant, a polyoxyethylene alkyl ether, or the like is particularly preferably used because the ejection stability of the ink can be improved.

A compound (1) represented by the following general formula (1) (2,4,7,9-tetramethyl-5-decyne-4,7-diol, or an ethylene oxide adduct thereof) may be used as the acetylene glycol-based surfactant.

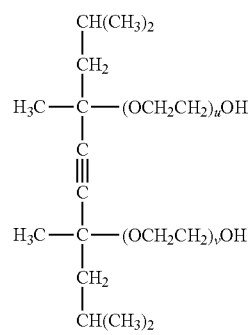

(In the general formula (1), U+V represents an integer of from 0 to 20)

[1-4] Other Solvent:

The ink of the present invention may further contain another water-soluble organic solvent as required. Although the kind of the water-soluble organic solvent is not particularly limited, various water-soluble organic solvents such as alcohols, polyhydric alcohols, glycol ethers, carboxylic acid amides, heterocycles, ketones, alkanolamines, and ureas may be used.

[1-5] Other Additive:

The ink of the present invention may contain other additives as required. Examples of the additives may include a pH adjustor, a rust inhibitor, an antiseptic, a mildewproofing agent, an antioxidant, a reduction inhibitor, and a salt.

[1-6] Water:

Deionized water (ion-exchanged water) is preferably used as the water. The content of the water is not particularly limited. However, the content is preferably 30 mass % or more and 90 mass % or less, more preferably 40 mass % or more and 85 mass % or less, still more preferably 50 mass % or more and 80 mass % or less with respect to the total mass of the ink. Setting the content to 30 mass % or more can hydrate the pigment and the water-soluble compounds, and can prevent the agglomeration of the pigment and the water-soluble compounds. Meanwhile, setting the content to 90 mass % or less can maintain the dispersed state of the pigment even when the amount of a water-soluble organic compound relatively increases and hence a volatile component in the aqueous medium (such as water) volatilizes, and hence can prevent the deposition and solidification of the pigment.

[1-7] Surface Tension:

The surface tension γ of the ink of the present invention is preferably 25 mN/m or more and 45 mN/m or less. Setting the surface tension to 25 mN/m or more can maintain the meniscus of an ink ejection orifice and hence can prevent such inconvenience that the ink flows out of the ink ejection orifice. In addition, setting the surface tension to 45 mN/m or less can optimize the absorption rate of the ink to a recording medium, and hence can prevent such inconvenience that fixation becomes insufficient owing to insufficient absorption of the ink.

The surface tension of the ink of the present invention means a value measured by a plate method using a platinum plate with an automatic surface tensiometer (for example, "CBVP-Z type" manufactured by Kyowa Interface Science Co., LTD.) under the conditions of a temperature of 25° C. and a humidity of 50%. The surface tension of the ink can be adjusted by, for example, the addition amount of the surfactant, and the kind and content of the water-soluble organic solvent.

[1-8] Viscosity:

The viscosity η of the ink of the present invention is preferably 1.5 mPa·s or more and 5.0 mPa·s or less, more preferably 1.6 mPa·s or more and 3.5 mPa·s or less, still more preferably 1.7 mPa·s or more and 3.0 mPa·s or less. Setting the viscosity to 1.5 mPa·s or more can result in the formation of a good ink droplet. Meanwhile, setting the viscosity to 5.0 mPa·s or less improves the flowability of the ink, and hence improves the ink suppliability to a nozzle, and thereby improving the ejection stability of the ink.

The viscosity of the ink means a value measured with an E-type viscometer (for example, "RE-80L viscometer" manufactured by Toki Sangyo Co., Ltd.) under the condition of a temperature of 25° C. according to JIS Z 8803. The viscosity of the ink can be adjusted by, for example, the kind and amount of the surfactant and the kind and amount of the water-soluble organic solvent.

[1-9] pH:

The pH of the ink of the present invention is preferably 7.5 or more and 10.0 or less, more preferably 8.5 or more and 9.5 or less. A pH of less than 7.5 is not preferred because the dispersion stability of the pigment particles deteriorates and hence the agglomeration of the pigment particles is liable to occur. On the other hand, a pH in excess of 10.0 is not preferred because of the following reason. Such pH of the ink is so high that some member of an apparatus to be used is subjected to a chemical attack through contact with the ink, which leads to the elution of an organic matter or inorganic matter in the ink. As a result, ejection failure occurs. The pH of the ink means a value measured under the condition of a temperature of 25° C. with a pH meter (such as a D-51 manufactured by HORIBA, Ltd.).

[2] Recording Head:

Now, a recording head according to an embodiment of the present invention is described with reference to the attached drawings. However, the recording head of the present invention is not limited to a structure described below.

Figure 1B:
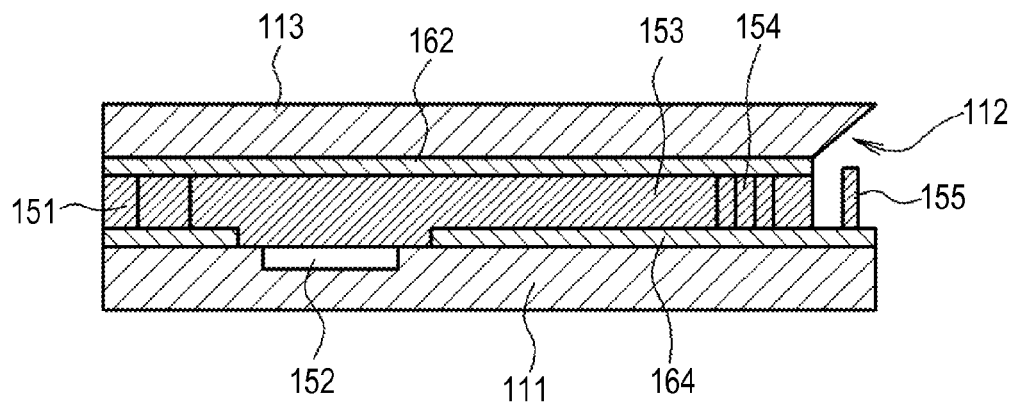
FIG. 1B is a side view schematically illustrating the internal structure of the nozzle illustrated in FIG. 1A.
Figure 1C:
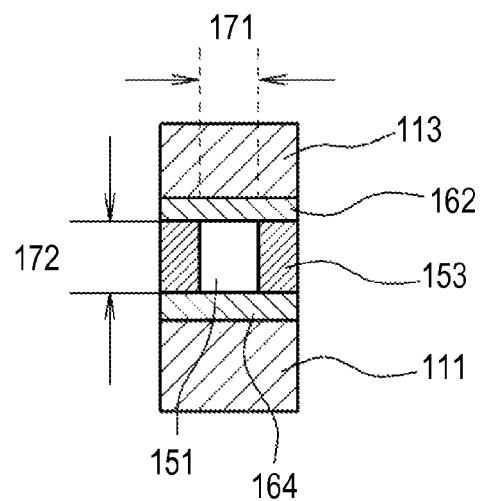
FIG. 1C is a front view schematically illustrating an ink ejection orifice of the nozzle illustrated in FIG. 1A.

[2-1] Structure of Nozzle Portion:

First, a structure of a nozzle portion is described with reference to FIGS. 1A to 1C. FIG. 1A is a top view schematically illustrating an internal structure of nozzles of the recording head. FIG. 1B is a side view schematically illustrating the internal structure of the nozzle illustrated in FIG. 1A. FIG. 1C is a front view schematically illustrating an ink ejection orifice of the nozzle illustrated in FIG. 1A.

In the recording head of the thermal system, as illustrated in FIG. 1A, a nozzle array is formed of a plurality of nozzle flow paths 159 partitioned by nozzle walls 153, a plurality of ink ejection orifices 151 communicating with the nozzle flow paths 159 are formed, and a heater 152 for ink ejection is disposed in each of the nozzle flow paths 159. The head having such a structure can cause an ink droplet to fly from the ink ejection orifice 151 by heating ink filled into the nozzle flow path 159 with the heater 152 so as to generate a bubble in the ink.

In the illustrated embodiment, a nozzle filter 155 for trapping foreign matters floating in an ink flow path in the recording head is disposed between the nozzle flow paths 159 and a common liquid chamber 112. Further, a top board member 113 to which a nozzle top board 162 is bonded includes an ink supply opening (not shown) formed by anisotropic etching or the like so as to allow ink from the outside to be introduced from the common liquid chamber 112 to the nozzle flow paths 159.

Right and left side surfaces of each nozzle flow path 159 are partitioned by the nozzle walls 153. In addition, an upper surface side of the nozzle flow path 159 is partitioned by the nozzle top board 162, and a bottom surface side thereof is partitioned by a nozzle bottom board 164. That is, the nozzle flow path 159 is an inner space having a substantially quadrangular prism shape partitioned from a surrounding space with the nozzle walls 153, the nozzle top board 162, and the nozzle bottom board 164 being partition walls. The nozzle top board 162 is bonded to the top board member 113 formed of Si or the like, and the nozzle bottom board 164 is bonded to a heater substrate 111.

The ink ejection orifice 151 is an opening portion for ejecting ink, which is formed at one end of the nozzle flow path 159, and communicates with the common liquid chamber 112 via the nozzle flow path 159. The ink ejection orifice 151 is formed on a face surface. In the illustrated example, the face surface is formed integrally with the nozzle walls 153, but may be formed by providing a face plate separately. The opening area of the ink ejection orifice 151 is set to 100 µm² or more and 350 µm² or less. When the opening area is set to 100 µm² or more, the generation of a non-ejection nozzle can be prevented. On the other hand, when the opening area is set to 350 µm² or less, minute liquid droplets in which the amount of one ink droplet is 10 pL or less can be formed, and a resolution of 600 dpi or more can be achieved. Note that, the opening area is represented by a product of an ejection orifice width 171 and an ejection orifice height 172.

The recording head is a line type head, in which a plurality of nozzle flow paths form a nozzle array. The number of nozzle flow paths that form the nozzle array is not particularly limited. However, in order to exert the effects of the present invention, it is necessary that the total number of nozzles in the nozzle array be 1,200 or more. It is preferred that the total number of nozzles in the nozzle array be 1,200 or more and 9,600 or less, and it is further preferred that the total number of nozzles in the nozzle array be 1,200 or more and 4,800 or less. Further, it is necessary that the length of the nozzle array be 2 inches or more, and it is preferred that the length of the nozzle array be 2 inches or more and 4 inches or less.

The heater 152 is a heating unit for generating bubbles in ink filled into the nozzle flow path 159 by heating. The heater 152 is disposed on the heater substrate 111. As the heater 152, a resistor (for example, a resistor made of tantalum nitride or the like) can be used. Electrodes (not shown) made of aluminum or the like for electric conduction are connected to the heater 152, and a switching transistor (not shown) for controlling the electric conduction to the heater 152 is connected to one of the electrodes. The drive of the switching transistor is controlled by an integrated circuit (IC) formed of a circuit such as a gate element for control, and the switching transistor is driven with a predetermined pattern by a signal from outside of the recording head.

The recording head can be driven with a drive frequency of 1 kHz or more and 10 kHz or less. By driving the recording head with a drive frequency of 1 kHz or more, even when the amount of ink per droplet is extremely small, the amount of ink provided per unit time can be increased to increase the amount of image data and the number of recording dots. In other words, a high quality image can be printed at high speed. By driving the recording head with a drive frequency of 10 kHz or less, such an inconvenience is inhibited that the stability of ejection is reduced due to an insufficient supply amount of ink to the nozzle with respect to the amount of ejected ink in high speed printing as described above. In order to obtain the above-mentioned effects with more reliability, it is preferred that the recording head be driven with a drive frequency of 3 kHz or more and 8 kHz or less. Further, it is also preferred that the recording head according to the present invention be driven with a drive frequency of 6 kHz or more and 10 kHz or less, because the stability of ejection is less liable to be reduced and ejection failure of the nozzle is less liable to occur even with a high drive frequency.

It is preferred that the total length of the nozzle be set to 200 µm or more and 300 µm or less. The "total length of the nozzle" in this case means the length of the nozzle flow path 159 and specifically means a length from an end on the ink ejection orifice 151 side to an end on the common liquid chamber 112 side of the nozzle wall 153 forming the nozzle flow path 159.

The nozzle flow path 159 is divided into a nozzle front portion 181, which is a portion from a heater center 157 to the end on the ink ejection orifice 151 side, and a nozzle back portion 182, which is a portion from the heater center 157 to the end on the common liquid chamber 112 side. From the viewpoint of ejection speed, it is preferred that the flow resistance of the nozzle front portion 181 (front resistance) and the flow resistance of the nozzle back portion 182 (back resistance) satisfy such a relationship that the value (front resistance)/(back resistance) is 0.3 or more and 0.8 or less. Note that, the flow resistance can be determined by calculation according to the Hagen-Poiseuille law from values such as a flow path sectional area, flow path length, and viscosity of ink to be ejected. That is, when ink to be used (and its viscosity) is determined, the value (front resistance)/(back resistance) can be adjusted by the flow path sectional area of a nozzle, flow path length, and the like.

[2-2] Nozzle Member:

The nozzle wall 153, the nozzle top board 162, and the nozzle bottom board 164 partitioning the nozzle flow path 159 can each be formed of, for example, a photosensitive resin. As the photosensitive resin, a negative photoresist or the like may be used. Specific examples of a commercial product may include: "SU-8 Series" and "KMPR-1000" (manufactured by Kayaku Microchem); and "TMMR," "TMMR S2000," and "TMMF S2000" (manufactured by TOKYO OHKA KOGYO CO., LTD.). Of those, an epoxy-based photosensitive resin excellent in solvent resistance and strength as a nozzle wall is preferably used. A particularly preferred commercial product is specifically, for example, "TMMR S2000" manufactured by TOKYO OHKA KOGYO CO., LTD.

[2-3] Hydrophilic Region, Water-Repellent Region:

The recording head of the present invention is preferably such that a hydrophilic region or a water-repellent region is formed on the peripheral edge of an ink ejection orifice. Which one of the hydrophilic region and the water-repellent region is formed has only to be determined in consideration of the kind of the coloring material of the ink to be used and the surface tension of the ink.

For example, when an ink whose coloring material is a pigment or whose surface tension is 34 mN/m or less is used, a recording head (hydrophilic head) in which a hydrophilic region is formed on the peripheral edge of an ink ejection orifice is preferred. In addition, a hydrophilic region having a contact angle with the ink to be used of 60° or less is preferably formed on the peripheral edge of the ink ejection orifice, and a hydrophilic region having a contact angle of 0° (that is, forming no contact angle) is more preferably formed. Note that, the contact angle of a hydrophilic region or a water-repellent region can be measured in conformity with JIS R 3257 with a contact angle meter (such as a product available under the trade name "SImage-mini" from Excimer Inc.) by an ATAN1/2θ method. Contact angles are measured by the method in Examples to be described later as well.

The hydrophilic region can be formed by a method involving forming a member (face member) in which an ink ejection orifice is formed with a hydrophilic material, a method involving subjecting the surface (face surface) of the face member to hydrophilic treatment, a method involving providing a hydrophilic film to the face surface, or the like.

As the face member, a resin such as an epoxy resin, in particular, an epoxy-based photosensitive resin can be used.

As the method involving subjecting a face surface to hydrophilic treatment, there may be mentioned a method involving roughening a face surface. Examples of the surface roughening method may include laser irradiation, $UV/O_3$ treatment, plasma treatment, heat treatment, oxidation treatment, and embossing treatment. Lasers that may be used in the laser irradiation include an excimer laser, a YAG laser, a $CO_2$ laser, and the like. Further, a peripheral edge portion of an ink ejection orifice may also be treated by a method involving soaking the peripheral edge portion in a liquid having high hydrophilicity for a long period of time. As the "liquid having high hydrophilicity", there may be mentioned pigment ink and the like. For example, it is appropriate that a face member be soaked in pigment ink to be used for 10 minutes or more.

As the method involving providing a hydrophilic film to a face surface, there may be mentioned a method involving forming a metal film or a hydrophilic resin film on a face surface. Needless to say, the hydrophilic film has hydrophilicity, and the hydrophilic film is preferably formed of a material having satisfactory adhesiveness with respect to a face member. As such material, there may be mentioned a composition containing a water-soluble resin and a water-insoluble low molecular weight compound. For example, the hydrophilic film can be formed by dissolving a water-soluble resin (hydroxypropyl cellulose, etc.) and a water-insoluble low molecular weight compound (bisphenol A, etc.) in an appropriate solvent (dimethylformamide, etc.), applying the obtained solution to a face surface, drying the solution, and treating the dried solution with alcohol or the like as needed.

It is appropriate that the method of forming a hydrophilic region be selected from among the above-mentioned methods as appropriate depending on the material forming a face member. Further, the hydrophilic region may be formed by a combination of two or more kinds of the above-mentioned methods. Of the above-mentioned methods, preferred is a method involving forming a nozzle peripheral portion with an epoxy-based photosensitive resin, treating the nozzle peripheral portion with $UV/O_3$, and subjecting the nozzle peripheral portion to hydrophilic treatment by soaking the nozzle peripheral portion in pigment ink.

In addition, for example, when an ink whose coloring material is a dye and whose surface tension is more than 34 mN/m is used, a recording head (water-repellent head) in which a water-repellent region is formed on the peripheral edge of an ink ejection orifice is preferred. In addition, a water-repellent region having a contact angle with the ink to be used of 90° or more is more preferably formed on the peripheral edge of the ink ejection orifice, and a water-repellent region having a contact angle with the ink to be used of 100° or more is particularly preferably formed.

The water-repellent region can be formed by, for example, a method involving applying a water-repellent film to the surface (face surface) of a member (face member) having formed therein an ink ejection orifice.

The method involving applying the water-repellent film to the face surface can be, for example, a method involving forming an ultra-water-repellent resin film on the face surface. The ultra-water-repellent resin film can be formed by a conventionally known method. Examples thereof may include a method involving applying a fluorine resin, a silicone resin, or the like to the face surface to form a resin film; and a method involving subjecting a fluorine-based monomer to plasma polymerization on the face surface to form a fluorine resin film. A method involving forming a water/oil-repellent resin film on the face surface may also be adopted. An example of the method may be a method involving forming a film formed of a fluorine resin obtained by polymerizing a fluorocarbon compound. In particular, the following method is preferred: a solution is prepared by dissolving a fluorine-containing silicone coupling agent (such as "KP-801M" manufactured by Shin-Etsu Chemical Co., Ltd.) in a fluorine-based solvent (such as "CXT-809A" manufactured by ASAHI GLASS CO., LTD., or "<Novec> HFE-7100," "<Novec> HFE-7200," or "<Novec> HFE-71IPA" manufactured by Sumitomo 3M Limited), and the solution is deposited from the vapor onto the face surface under heat to form a water-repellent film.

Figure 2A:
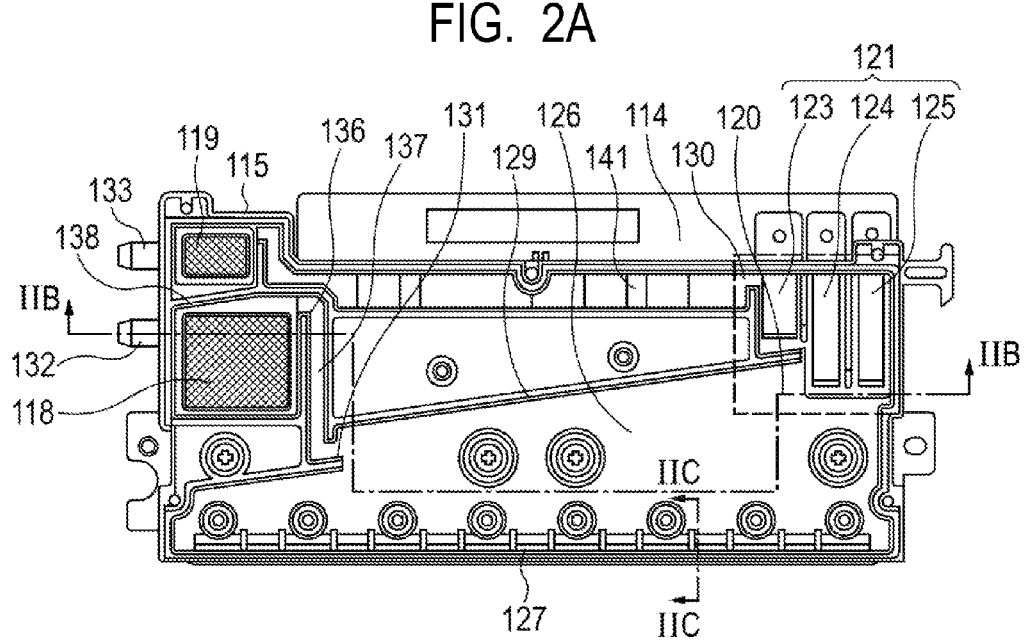
FIG. 2A is a front view schematically illustrating a recording head according to the present invention.
Figure 2B:
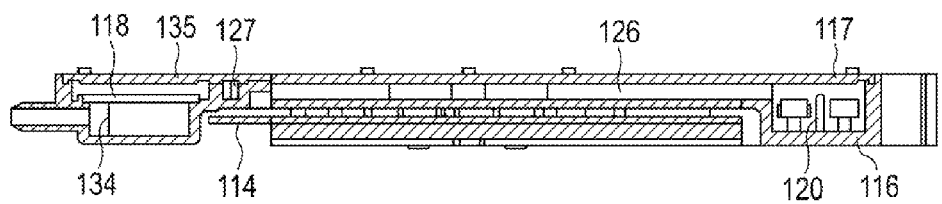
FIG. 2B is a sectional view illustrating the recording head taken along the line IIB-IIB of FIG. 2A.
Figure 2C:
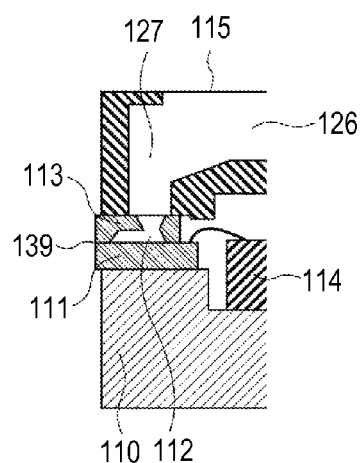
FIG. 2C is a sectional view illustrating the recording head taken along the line IIC-IIC of FIG. 2A.

[2-4] Entire Structure of Recording Head:

Next, an entire structure of the recording head is described with reference to FIGS. 2A to 2C. The recording head having a structure as illustrated in FIGS. 2A to 2C is disclosed in Japanese Patent Application Laid-Open No. 2013-014111. Therefore, the disclosure of Japanese Patent Application Laid-Open No. 2013-014111 is incorporated herein by reference and only a brief description thereof is made. FIG. 2A is a front view schematically illustrating the recording head according to the present invention. FIG. 2B is a sectional view taken along the line IIB-IIB of FIG. 2A. FIG. 2C is a sectional view taken along the line IIC-IIC of FIG. 2A. For the sake of convenience of description, a liquid supply case cover is omitted in the front view.

As illustrated in FIGS. 2A to 2C, it is preferred that the recording head according to the present invention to be a line type head include the common liquid chamber 112 communicating with the plurality of nozzle flow paths that form the nozzle array, a liquid supply port 127 communicating with the common liquid chamber 112, a main liquid supply chamber 126 communicating with the liquid supply port 127, a liquid supply path 137 communicating with the main liquid supply chamber 126, a liquid supply chamber (first liquid supply chamber 134 and second liquid supply chamber 135) communicating with the liquid supply path 137, a supply filter 118 provided so as to partition the liquid supply chamber into the first liquid supply chamber 134 and the second liquid supply chamber 135 from an upstream side along a flow during liquid supply, a gas-liquid separation portion 120 provided in part of the main liquid supply chamber 126, and an air chamber 141 communicating with the gas-liquid separation portion 120.

Further, it is preferred that the nozzle flow paths, the common liquid chamber 112, the liquid supply port 127, the main liquid supply chamber 126, the liquid supply path 137, the liquid supply chamber (the first liquid supply chamber 134 and the second liquid supply chamber 135), the supply filter 118, the gas-liquid separation portion 120, and the air chamber 141 be disposed on a plane parallel to a plane including an arrangement direction of the nozzle flow paths and an ejection direction of the liquid, and the main liquid supply chamber 126, the liquid supply path 137, the supply filter 118, the gas-liquid separation portion 120, and the air chamber 141 be disposed without being laminated respectively.

The recording head having the structure as illustrated in FIGS. 2A to 2C is referred to as a recording head of a gas-liquid separation type. The recording head of the gas-liquid separation type fills ink in a nozzle thereof using self weight of the ink, and thus, it is extremely difficult to secure the stability of ejection compared with a recording head of a conventional structure. Therefore, it can be said that the recording head of the gas-liquid separation type is an embodiment that can most enjoy the effects of the present invention.

A base plate 110 made of ceramic supports the heater substrate 111 made of silicon. On the heater substrate 111, a plurality of electrothermal converters (heaters or energy generation portions) serving as ejection energy generation elements for a liquid and a plurality of flow path walls for forming nozzles corresponding to the electrothermal converters are formed. Further, a liquid chamber frame surrounding the common liquid chamber 112 communicating with each nozzle is also formed on the heater substrate 111. The top board member 113 forming the common liquid chamber 112 is joined onto a side wall of the nozzle and the liquid chamber frame thus formed. Thus, the heater substrate 111 and the top board member 113 are laminated so as to adhere to the base plate 110 under the condition of being integrated with each other. Such lamination and adhesion are performed with an adhesive having a satisfactory heat conductivity such as silver paste. In a back portion of the heater substrate 111 on the base plate 110, a mounted printed circuit board (PCB) 114 is supported through use of a double-sided tape (not shown). Each ejection energy generation element on the heater substrate 111 and the PCB 114 are electrically connected to each other by wire bonding corresponding to each wiring.

A liquid supply member 115 is joined onto an upper surface of the top board member 113. The liquid supply member 115 is formed of a liquid supply case 116 and a liquid supply case cover 117. When the liquid supply case cover 117 closes the upper surface of the liquid supply case 116, a liquid chamber and a liquid supply path to be described later are formed. The liquid supply case 116 and the liquid supply case cover 117 are joined to each other through use of, for example, a thermosetting adhesive. Further, the liquid supply case 116 is provided with the supply filter 118 and a discharge filter 119. The supply filter 118 serves to remove foreign matters in a liquid supplied to the liquid supply member 115, and the discharge filter 119 serves to prevent foreign matters from entering from outside of the recording head. Each filter is fixed to the liquid supply case 116 by heat fusion. Further, the gas-liquid separation portion 120 is formed in part of the liquid supply case 116, and a liquid surface detection sensor 121 is mounted from outside so as to protrude to the gas-liquid separation portion 120. Thus, the amount of a liquid in the liquid chamber is controlled as described above.

Now, the structure of the liquid chamber, the liquid supply path, and the like formed by fitting of the two components, liquid supply case 116 and liquid supply case cover 117, is described. In a joining surface of the liquid supply case 116 with respect to the top board member 113, the liquid supply port 127 being a rectangular opening portion is formed substantially in parallel to an arrangement direction of nozzles over the width of the nozzle array, and the main liquid supply chamber 126 in a reservoir chamber shape is formed at an extended position of the liquid supply port 127. That is, the main liquid supply chamber 126 is formed substantially in parallel to the nozzle array over the width of the nozzle array. Further, a top surface on an opposed side of the liquid supply port 127 forms an inclination with the gas-liquid separation portion 120 being an uppermost portion (main liquid supply chamber inclination 129) substantially over the entire region. The main liquid supply chamber inclination 129 has two opening portions, one of which is a liquid communication portion 131 and the other of which is the gas-liquid separation portion 120.

The gas-liquid separation portion 120 forms part of the main liquid supply chamber 126, and the depth of the part formed of the gas-liquid separation portion 120 is larger than that of the other part of the main liquid supply chamber 126. The purpose of this structure is to enhance the effect of breaking air bubbles mixed in a liquid in the liquid chamber as described later. In the embodiment illustrated in FIG. 2A, three electrodes of stainless steel are mounted in the gas-liquid separation portion 120, and are an upper limit detection electrode 123, a ground electrode 124, and a lower limit detection electrode 125 arranged in this order from the left side of FIG. 2A. The liquid surface in the main liquid supply chamber 126 is kept between the upper limit and the lower limit by the electric conduction between the ground electrode 124 and the upper limit detection electrode 123 and the electric conduction between the ground electrode 124 and the lower limit detection electrode 125. In the ink jet head of the embodiment illustrated in FIG. 2A, the reliability of detection can be enhanced by detecting the liquid surface of a liquid subjected to gas-liquid separation.

An air communication portion 130 is disposed at an extended position of the gas-liquid separation portion 120, and the air chamber 141 serving as an air flow path is formed at a further extended position. The discharge filter 119 described above is provided at a still further extended position and communicates with a discharge joint 133. The discharge filter 119 is formed of a material having water repellency. Even when a liquid flows into the air flow path (air chamber 141) and ink sticks to the discharge filter 119 to form a meniscus of the ink in the discharge filter 119, the capillary force of a filter portion can be reduced by the water repellency and the ink can be removed easily.

On the other hand, the liquid supply path 137 is provided via the liquid communication portion 131 provided at the main liquid supply chamber inclination 129. The liquid supply path 137 forms a tubular shape from the liquid communication portion 131 to the vicinity of the supply filter 118 and is formed on a plane that is substantially identical and parallel to that of the main liquid supply chamber 126. The supply filter 118 is also disposed on a plane that is almost identical and parallel to that of the main liquid supply chamber 126. The supply filter 118 is provided so as to partition the liquid supply chamber into two chambers. The chamber on a side communicating with a supply joint 132, that is, the chamber on an upstream side along a flow of liquid supply in the recording head is defined as the first liquid supply chamber 134, and the chamber on a downstream side is defined as the second liquid supply chamber 135. The supply filter 118 is disposed on a plane that is substantially identical and parallel to that of the main liquid supply chamber 126, and hence the first liquid supply chamber 134 and the second liquid supply chamber 135 adjacent to both surfaces of the supply filter 118 are also disposed on a plane that is substantially parallel to that of the main liquid supply chamber 126 or an ink ejection orifice arrangement surface 139.

The second liquid supply chamber 135 has an opening (hereinafter referred to as "second liquid supply chamber opening 136") above the supply filter 118 and communicates with the liquid supply path 137 through the second liquid supply chamber opening 136. Further, a top surface of the second liquid supply chamber 135 is provided with an inclination (hereinafter referred to as "second liquid supply chamber inclination 138") with the second liquid supply chamber opening 136 being an uppermost portion.

As described above, the main liquid supply chamber 126, the gas-liquid separation portion 120, the liquid supply path 137, the supply filter 118, the first liquid supply chamber 134, and the second liquid supply chamber 135 are each provided on a plane that is substantially parallel to the ink ejection orifice arrangement surface 139. On the other hand, as illustrated in the cross-section taken along line IIB-IIB, it is important that the main liquid supply chamber 126, the liquid supply path 137, the supply filter 118, and the gas-liquid separation portion 120 be disposed so as not to overlap each other in a direction perpendicular to the plane.

It is preferred that the supply filter 118 be a mesh made of stainless steel having a filter pore diameter of 1 μm or more and 10 μm or less and a filter area of 10 mm² or more and 500 mm² or less. The supply filter 118 having a filter pore diameter of 1 μm or more and a filter area of 10 mm² or more can reduce flow path resistance (pressure loss) and can facilitate movement of an air bubble in the recording head. In order to obtain the above-mentioned effects with more reliability, it is further preferred that the filter area be 200 mm² or more. On the other hand, the supply filter 118 having a filter pore diameter of 10 μm or less can prevent dust from flowing into the nozzle without fail, and the supply filter 118 having a filter area of 500 mm² or less can downsize the recording head. In order to obtain the above-mentioned effects with more reliability, it is further preferred that the filter pore diameter be 3 μm or more and 8 μm or less.

[2-5] Filling of Ink:

In the recording head according to the present invention, ink jet recording ink is filled in the inner space of the line type head, which communicates with the ink ejection orifices. It is preferred that the ink be filled at least at a portion of the inner space from ink ejection orifices to the common liquid chamber (that is, the nozzle flow paths and the common liquid chamber).

[3] Ink Jet Recording Apparatus:

The ink jet recording apparatus according to the present invention includes an ink jet recording head and an ink storage portion for storing ink to be supplied to the recording head, and has a feature in that the recording head is the recording head according to the present invention. The form of the ink storage portion is not particularly limited. For example, the ink storage portion may be an ink tank as illustrated in FIG. 3.

Figure 3:
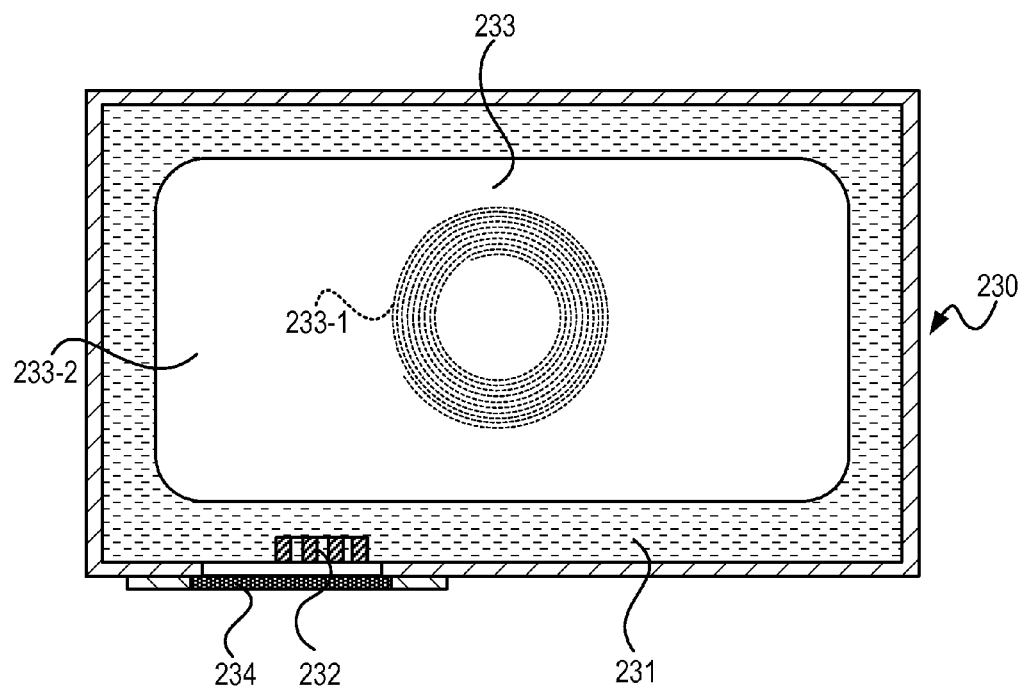
FIG. 3 is an enlarged sectional view illustrating an ink tank.

[3-1] Ink Tank:

FIG. 3 is an enlarged sectional view illustrating the ink tank. An ink tank 230 is a container for storing liquid, and a liquid chamber (ink chamber 231) for storing ink is formed therein. The ink chamber 231 has a closed space formed therein, which can communicate with the outside only via a joint portion 232. The ink tank 230 is formed so as to be removable from the recording head. Further, the ink tank 230 is provided above the recording head. The ink chamber 231 is formed of a flexible member, and has built therein a spring 233-1 for generating negative pressure and a pressure plate 233-2 coupled to the spring 233-1. The spring 233-1 urges the ink chamber 231 via the pressure plate 233-2 from the inside to the outside to enlarge inner space of the ink chamber 231. In other words, the spring 233-1 generates predetermined negative pressure in the ink chamber 231, and the spring 233-1, the pressure plate 233-2, and the ink chamber 231 are integrated with one another to form a negative pressure generation portion 233. The joint portion 232 is provided with a filter 234 made of a nonwoven fabric.

Figure 4:
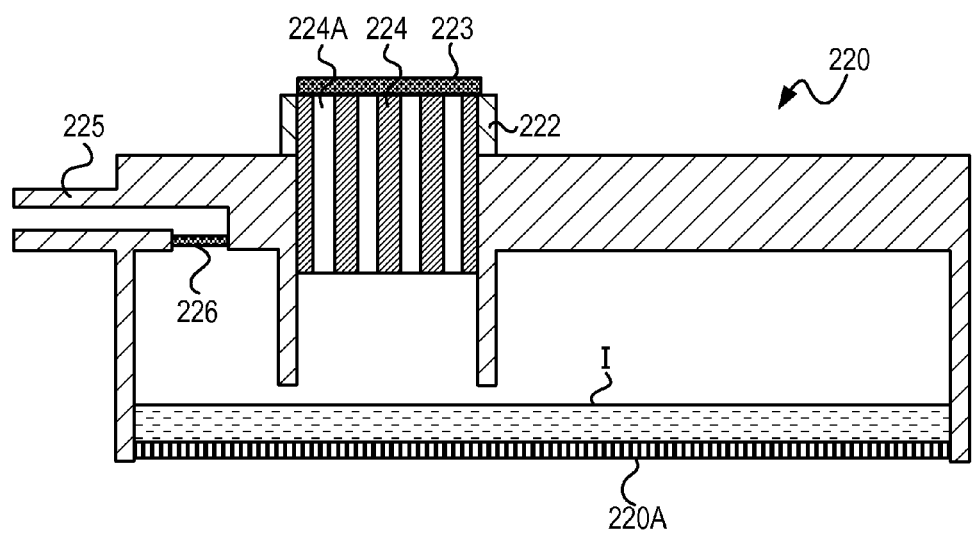
FIG. 4 is an enlarged sectional view of the recording head.

FIG. 4 is an enlarged sectional view of the recording head. A recording head 220 includes an energy generation element (not shown) such as an electrothermal conversion element (heater for ink ejection). The energy generation element causes ink I in an ink chamber 221 (liquid in the liquid chamber) to be ejected from an ejection orifice 220A. In the ink chamber 221, air (gas) exists together with the ink I. Therefore, an ink storage portion (liquid storage portion) having the ink I stored therein and an air storage portion (gas storage portion) having air (gas) stored therein are formed in the ink chamber 221.

An ink supply portion 222 for allowing the ink chamber 221 to communicate with the ink chamber 231 of the ink tank is provided above the ink chamber 221. The average width of the ink supply portion 222 is about 10 mm. Further, a filter member 223 is provided in an opening portion of the ink supply portion 222. The illustrated filter member 223 is a mesh formed of SUS. Metal fibers are woven into the mesh. A fine mesh of the filter member 223 suppresses entry of dust into the recording head from the outside.

Figure 5A:
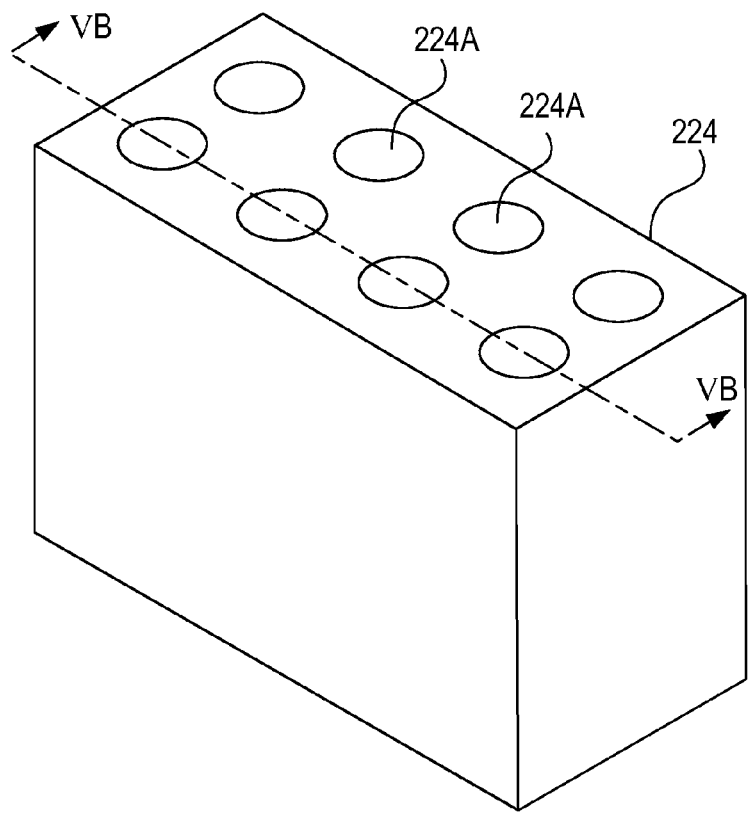
FIG. 5A is an enlarged perspective view illustrating an ink retaining member illustrated in FIG. 4.
Figure 5B:
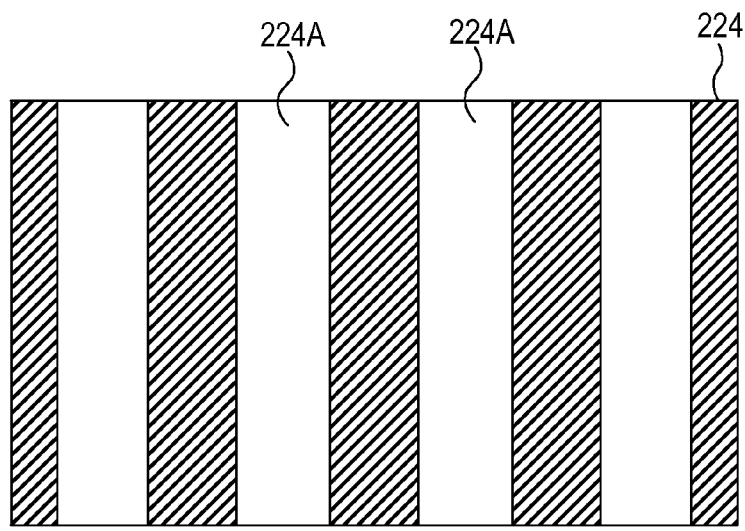
FIG. 5B is a sectional view illustrating the ink retaining member taken along the line VB-VB of FIG. 5A.

A lower surface of the filter member 223 is in press contact with an ink retaining member 224 capable of retaining ink therein. FIG. 5A is an enlarged perspective view of the ink retaining member illustrated in FIG. 4. FIG. 5B is a sectional view illustrating the ink retaining member taken along the line VB-VB of FIG. 5A. As illustrated in FIGS. 5A and 5B, a plurality of flow paths 224A that are circular in cross-section are formed in the ink retaining member 224. Each of the flow paths 224A has a diameter of about 1.0 mm.

Further, as illustrated in FIG. 4, an opening portion 225 is provided in an upper portion of the ink chamber 221. A filter 226 is provided in the opening portion 225. The opening portion 225 is configured to be coupled to a transportation portion (not shown) that is an outside flow path. The transportation portion is a flow path through which liquid and/or gas can be transported. The opening portion 225 is configured to cause the ink I and/or gas in the ink chamber 221 to flow to the outside, or, to cause liquid (such as ink) and/or gas outside the recording head 220 to flow into the ink chamber 221. In other words, the opening portion 225 is configured not only to cause liquid to solely flow out or flow in but also to cause gas to flow out or flow in together with the liquid.

By coupling the joint portion 232 of the ink tank 230 illustrated in FIG. 3 to the ink supply portion 222 of the recording head 220 illustrated in FIG. 4, the ink tank 230 illustrated in FIG. 3 is directly connected to the recording head 220 illustrated in FIG. 4. At this time, the filter 234 of the ink tank 230 illustrated in FIG. 3 and the filter member 223 of the recording head 220 illustrated in FIG. 4 are in press contact with each other in a vertical direction. The coupled portion between the ink tank and the recording head formed in this way can maintain airtightness thereof by being surrounded by an elastic cap member formed of rubber. The above-mentioned structure in which the recording head and the ink tank are directly connected with each other is preferred in that an ink supply path (liquid supply path) therebetween can be extremely short.

[3-2] Entire Structure of Recording Apparatus:

Structures and the like of other portions of the ink jet recording apparatus are not particularly limited. For example, a recording apparatus 300 illustrated in FIG. 6 can be suitably used.

Figure 6:
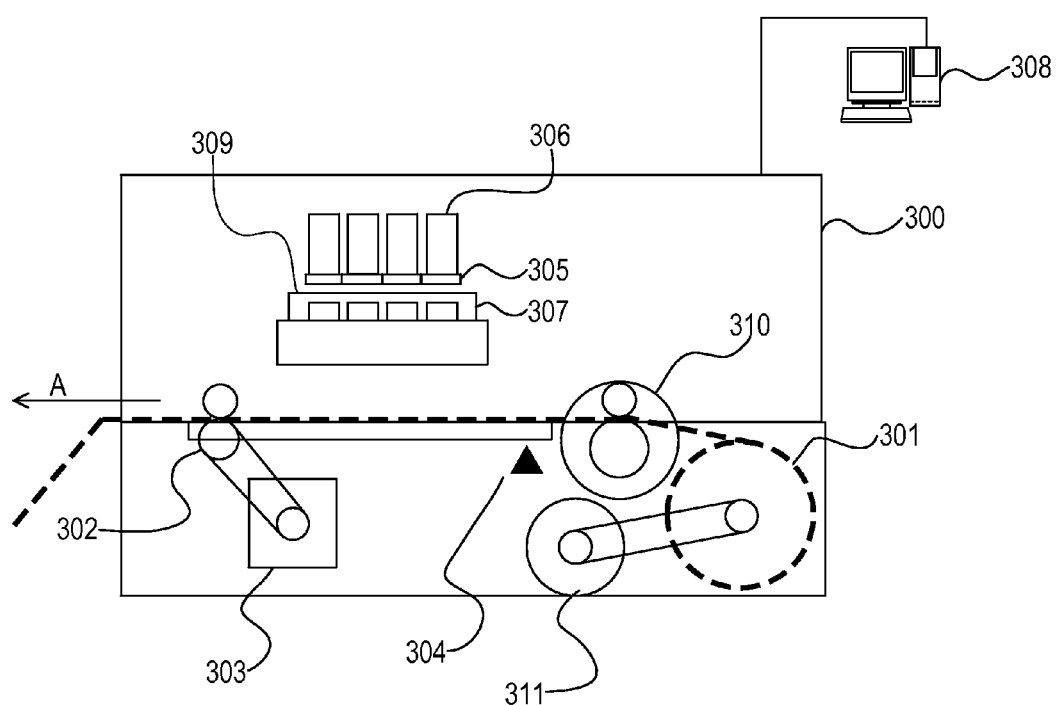
FIG. 6 is a schematic structural view schematically illustrating an entire structure of an ink jet recording apparatus.

FIG. 6 is a schematic structural view schematically illustrating an entire structure of the ink jet recording apparatus. An external host apparatus (computer apparatus 308) is connected to the recording apparatus 300. The recording apparatus 300 is configured to eject, based on recording data that is input from the computer apparatus 308, ink from recording heads 305 to record an image.

In the recording apparatus 300, a label paper sheet to which a plurality of labels are temporarily affixed is used as a recording medium 301. The recording medium 301 is set in a state of being rolled into a roll shape. However, in the ink jet recording apparatus according to the present invention, as the recording medium, not only paper but also any material such as cloth, plastic film, metal plate, glass, ceramic, wood, or leather may be used insofar as the material can receive ink.

The recording apparatus 300 includes, as a conveyance unit for conveying the recording medium 301, a conveyance motor 303, a conveyance roller 302, a rotary encoder 310, and a roll motor 311. By driving the conveyance roller 302 by the conveyance motor 303, the recording medium 301 can be conveyed at a uniform speed in a direction indicated by the arrow A. The rotary encoder 310 can detect the speed and the amount of conveyance of the recording medium 301. The recording medium 301 can be rolled again by the roll motor 311 in a direction opposite to the direction indicated by the arrow A. A sheet detection sensor 304 is a sensor for detecting a specific portion of the recording medium 301. In the illustrated example, leading edges of the respective labels that are temporarily affixed to the label paper are detected. The timing of recording an image can be determined based on the above-mentioned detection.

The recording apparatus 300 includes, in an upper portion thereof, four recording heads 305 and ink tanks 306 corresponding thereto, respectively. The four recording heads are recording heads for ejecting ink of black, cyan, magenta, and yellow, respectively.

The recording head 305 is a so-called line type head formed so as to have a width larger than a maximum recording width of the recording medium 301, and includes a plurality of nozzles capable of ejecting ink. The ink ejection orifices of the nozzles open on a lower surface side of the recording head 305. The recording head 305 is disposed so that the longitudinal direction thereof is along the direction intersecting a direction of conveyance of the recording medium 301 (direction orthogonal to the direction indicated by the arrow A in FIG. 6), and the plurality of nozzles are arranged along the longitudinal direction to form the nozzle array.

In the recording apparatus 300, the conveyance roller 302 is driven by the conveyance motor 303, and the conveyance roller 302 conveys the recording medium 301 at a uniform speed in the direction indicated by the arrow A. When the specific portion of the recording medium 301 is detected by the sheet detection sensor 304, based on the detection position, ink is ejected in sequence from the ink ejection orifices of the four recording heads 305. At this time, ink is supplied from the ink tanks 306 to the recording heads 305. In this way, when the recording medium 301 passes under the recording heads 305, ink is ejected from the plurality of nozzles of the recording heads 305 to record an image on the recording medium 301. Note that the recording heads 305 are line type heads and thus eject ink in a state of being fixed at a predetermined position. In other words, the recording heads 305 do not eject ink while being horizontally reciprocated like serial heads.

The recording apparatus 300 includes, as a recovery mechanism for carrying out recovery operation of the recording head 305, a capping mechanism 307, a blade 309, and the like.

The recovery operation is operation for causing the recording head 305 to recover so as to exert ejection performance that is as adequate as that in an initial state. The recovery operation may be, for example, suction recovery, pressurization recovery, preparatory ejection, or wiping recovery. The suction recovery is operation to remove, by suction with the capping mechanism 307, thickened ink in the nozzle of the recording head 305. The pressurization recovery is operation to discharge, by pressurization, thickened ink in the nozzle of the recording head 305 to the capping mechanism 307. The preparatory ejection is operation to discharge thickened ink in the nozzle to the capping mechanism 307 by ejection to stabilize an ink meniscus. The wiping recovery is operation to wipe a face surface of the recording head with the blade 309 to remove dust and ink adhering to the face surface. Those kinds of recovery operation may be used in combination.

The capping mechanism 307 is a mechanism for capping ink ejection orifices of the recording heads 305, and is disposed below the recording heads 305. The recording heads 305 and the capping mechanism 307 are configured to relatively move in right and left directions in FIG. 6. On the other hand, the blade 309 is a member for wiping the face surfaces of the recording heads 305, and is disposed below the recording heads 305.

When the suction recovery is performed, under a state in which the recording head 305 is capped by the capping mechanism 307, inside of a buffer tank (not shown) of the capping mechanism 307 is depressurized by a tube pump (not shown). In this way, thickened ink in the nozzle of the recording head 305 is removed by suction with the capping mechanism 307, to thereby refresh the inside of the nozzle.

When the pressurization recovery is performed, under a state in which the recording head 305 is capped by the capping mechanism 307, the inside of the nozzle of the recording head 305 is pressurized. In this way, thickened ink in the nozzle is discharged into a cap of the capping mechanism 307 by pressurization, to thereby refresh the inside of the nozzle.

When the wiping recovery is performed, the blade 309 is driven by a blade motor (not shown), and the face surface of the nozzle of the recording head 305 is wiped. Further, pressurization recovery (preparatory ejection) is performed. In this way, the face surface of the nozzle is cleaned and a meniscus in the ink ejection orifice is stabilized.

Note that ink accumulated in the capping mechanism 307 by those kinds of recovery operation is sucked by a tube pump (not shown) when the accumulation reaches a predetermined amount, and thus discarded in a waste ink tank (not shown).

Figure 7:
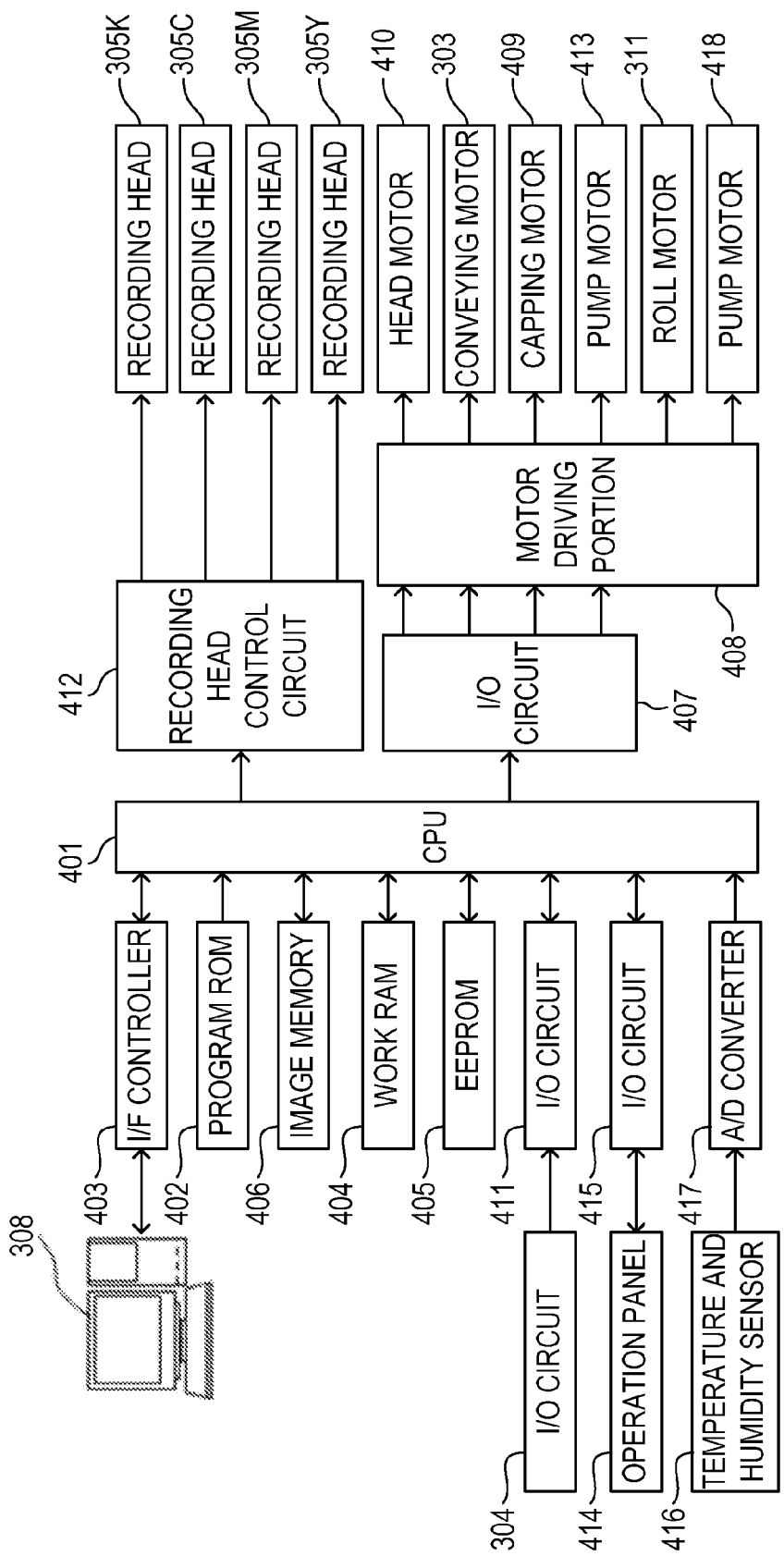
FIG. 7 is a block diagram illustrating a control system of the recording apparatus illustrated in FIG. 6.

[3-3] Control System:

Next, control of the ink jet recording apparatus is described. FIG. 7 is a block diagram illustrating a control system of the recording apparatus illustrated in FIG. 6. The recording apparatus includes, in addition to a recording mechanism including the recording head, control system components such as a central processing unit (CPU), a USB interface portion, and a ROM. A CPU 401 runs a program stored in a program ROM 402 to control portions of the recording apparatus. The program ROM 402 stores a program and data for controlling the recording apparatus. Processing by the recording apparatus is realized by the CPU 401 that reads and runs a program in the program ROM 402.

The recording data that is output from the computer apparatus 308 is input to an interface controller 403 of the recording apparatus. Commands for instructing the number, the kind, the size, and the like of the recording medium (labels) are also input to the interface controller 403 and are analyzed. In addition to analysis of those commands, the CPU 401 executes arithmetic processing for controlling the entire recording apparatus, such as input of recording data, recording operation, and handling of a recording medium. The arithmetic processing is executed based on processing programs stored in the program ROM 402. The programs include a program corresponding to a procedure in a flow chart of FIG. 8 to be described below. Further, as a work memory for the CPU 401, a work RAM 404 is used. An EEPROM 405 is a rewritable nonvolatile memory. In the EEPROM 405, parameters unique to the recording apparatus are stored, such as time at which the previous recovery operation is carried out, and correction values for finely adjusting distances among the plurality of recording heads and a recording position in the direction of conveyance (registration in a longitudinal direction).

More specifically, the CPU 401 analyzes the input commands, and after that, expands image data of respective color components of the recording data into a bitmap in an image memory 406. Based on this data, an image is rendered. Further, the CPU 401 controls the conveyance motor 303, the roll motor 311, a capping motor 409, a head motor 410, and a pump motor 418 via an input/output circuit 407 and a motor drive portion 408. The capping motor 409 is a motor for driving the capping mechanism 307. The head motor 410 is a motor for moving recording heads 305K, 305Y, 305M, and 305C. The pump motor 418 is a motor for driving the tube pump. The recording heads 305K, 305Y, 305M, and 305C are moved among a capping position, a recording position, and a recovery position. The capping position is a position at which capping is carried out by the capping mechanism 307. The recording position is a position at which an image is recorded. The recovery position is a position at which the recovery operation is carried out.

When an image is recorded by the recording apparatus, as illustrated in FIG. 6, the conveyance roller 302 is driven by the conveyance motor 303 to convey the recording medium 301 (in the illustrated example, label paper sheets) at a uniform speed. Then, the rotary encoder 310 detects the speed and the amount of conveyance of the recording medium 301. In the control system illustrated in FIG. 7, in order to determine the timing of recording an image relative to the recording medium that is conveyed at the uniform speed, the sheet detection sensor 304 detects a leading edge of a label. A detection signal from the sheet detection sensor 304 is input to the CPU 401 via an input/output circuit 411. When the recording medium is conveyed by the conveyance motor, in synchronization with a signal from the rotary encoder (not shown), the CPU 401 reads image data for the respective colors in sequence from the image memory 406. The image data is transferred via a recording head control circuit 412 to any one of the recording heads 305K, 305Y, 305M, and 305C corresponding thereto. Thus, the recording heads 305K, 305Y, 305M, and 305C eject ink based on the image data.

Operation of a pump motor 413 for driving a pump is controlled via the input/output circuit 407 and the motor drive portion 408. An operating panel 414 is connected to the CPU 401 via an input/output circuit 415. Environmental temperature and environmental humidity of the recording apparatus are detected by a hygrothermosensor 416, and are input to the CPU 401 via an A/D converter 417.

[3-4] Recovery Sequence:

When the environmental temperature becomes 40° C. or more and water evaporates, ink is more liable to stick to the recording head. Therefore, it is preferred to add a recovery sequence for recovering the face surface of the recording head when the head is in an open state in which the recording head is uncapped, and, at the same time, water evaporates.

FIG. 8 is a flow chart illustrating steps of the recovery sequence of the recording head. The recovery sequence illustrated in FIG. 8 is triggered when the recording head is uncapped, i.e., under a cap opening condition (Condition 501). When the recovery sequence is triggered, the hygrothermosensor obtains (detects) the environmental temperature and the environmental humidity of the recording apparatus (Step 502). As a result of the detection, when the environmental temperature is 40° C. or more and the environmental humidity is 70% or less (Condition 503), and at the same time, the cumulative amount of time from the previous suction recovery is one hour or more (Condition 504), pressurization recovery (preparatory ejection) for refreshing ink in the nozzle and wiping recovery for wiping and cleaning the face surface of the nozzle are carried out (Step 505). Note that, Condition 504 is reset when the suction recovery is carried out.

EXAMPLES

Now, the present invention is more specifically described in detail by way of Examples and Comparative Examples. However, the present invention is not limited to only the constitutions of Examples below. Note that, "part(s)" and "%" in the following description refer to "part(s) by mass" and "mass %", respectively, unless otherwise stated.

Preparation of Ink

Synthesis Example

Synthesis of (Meth)Acrylate-Based Random Copolymer 1,000 Parts of methyl ethyl ketone were loaded into a reaction vessel mounted with a stirring device, a dropping device, and a temperature sensor, and a reflux device having a nitrogen-introducing device in its upper portion, and the inside of the reaction vessel was replaced with nitrogen while the contents were stirred. While a nitrogen atmosphere in the reaction vessel was maintained, the temperature in the vessel was increased to 80° C. After that, 63 parts of 2-hydroxyethyl methacrylate, 141 parts of methacrylic acid, 417 parts of styrene, 188 parts of benzyl methacrylate, 25 parts of glycidyl methacrylate, 33 parts of a polymerization degree regulator (manufactured by NOF CORPORATION, trade name: "BLEMMER TGL"), and 67 parts of t-butyl peroxy-2-ethyl-hexanoate were mixed, and the resultant mixed liquid was dropped over 4 hours. After the completion of the dropping, the reaction was further continued at that temperature for 10 hours to provide a solution (resin content: 45.4%) of a (meth) acrylate-based random copolymer (A-1) having an acid value of 110 mgKOH/g, a glass transition point (Tg) of 89° C., and a weight-average molecular weight of 8,000.

Preparation of Black Pigment Dispersion to be Used in Coloring Material of Ink

The solution (resin content: 45.4%) of the (meth)acrylate-based random copolymer (A-1) obtained in the polymer solution preparation, a 25% aqueous solution of potassium hydroxide, water, and a carbon black pigment were loaded into a mixing tank having a cooling jacket, and were stirred and mixed to provide a mixed liquid. Here, their respective loading amounts are as follows: the amount of the carbon black pigment is 1,000 parts, the amount of the (meth)acrylate-based random copolymer is such that the ratio of its nonvolatile content to carbon black is 40%, the amount of the 25% aqueous solution of potassium hydroxide is such that 100% of the acid value of the (meth)acrylate-based random copolymer is neutralized, and the amount of the water is an amount required for setting the nonvolatile content of the mixed liquid to 27%. The resultant mixed liquid was caused to pass through a dispersing device filled with zirconia beads having a diameter of 0.3 mm and dispersed by a circulating system for 4 hours. Note that, the temperature of a dispersion liquid was maintained at 40° C. or less.

The dispersion liquid was extracted from the mixing tank. After that, a flow path between the mixing tank and the dispersing device was washed with 10,000 parts of the water, and the washing liquid and the dispersion liquid were mixed to provide a diluted dispersion liquid. The resultant diluted dispersion liquid was put into a distilling device, and a concentrated dispersion liquid was obtained by distilling off the total amount of methyl ethyl ketone and part of water. While the concentrated dispersion liquid that had been left standing to cool to room temperature was stirred, 2% hydrochloric acid was dropped to adjust its pH to 4.5. After that, its solid content was filtered out with a Nutsche-type filtering device and washed with water. The resultant solid content (cake) was put into a container and water was added thereto. After that, the cake was redispersed with a dispersion stirring machine and the pH of the resultant was adjusted to 9.5 with a 25% aqueous solution of potassium hydroxide. After that, coarse particles were removed with a centrifugal separator at 6,000 G over 30 minutes, and then the nonvolatile content of the remainder was adjusted. Thus, a carbon black pigment dispersion (nonvolatile content: 20%) was obtained. Further, pure water was added to adjust the pigment concentration of the resultant aqueous black pigment dispersion to about 14%, thereby obtaining a black pigment dispersion to be used in ink preparation to be described later.

Preparation of Cyan Pigment Dispersion to be Used in Coloring Material of Ink

A cyan pigment dispersion was prepared by the same method as that of the black pigment dispersion except that Pigment Blue 15:3 was used as a coloring material.

Preparation of Magenta Pigment Dispersion to be Used in Coloring Material of Ink A magenta pigment dispersion was prepared by the same method as that of the black pigment dispersion except that: Pigment Red 122 was used as a coloring material; and the ratio of the resin to the pigment was changed from 40% to 30%.

Preparation of Yellow Pigment Dispersion to be Used in Coloring Material of Ink

A yellow pigment dispersion was prepared by the same method as that of the black pigment dispersion except that: Pigment Yellow 74 was used as a coloring material; and the ratio of the resin to the pigment was changed from 40% to 35%.

Preparation of Ink

Example 1

An ink 1 of Example 1 was prepared by the following method. 21.4 Parts of the black pigment dispersion (pigment concentration: about 14%) were added as a coloring material to a container, and 27.5 parts of a 40% aqueous solution of solid ethylene urea (ethylene urea solid content: 11 parts), 7 parts of glycerin, 2 parts of triethylene glycol, and 3.1 parts of a 65% aqueous solution of solid bishydroxyethyl sulfone (bishydroxyethyl sulfone solid content: 2 parts) were added as water-soluble compounds thereto. Further, 0.5 part of Acetylenol E100 (manufactured by Kawaken Fine Chemicals Co., Ltd.) and 1.0 part of BC-20 (manufactured by Nikko Chemicals Co., Ltd.) as nonionic surfactants were added to the mixture, and the amount of the entirety was set to 100 parts by charging pure water (ion-exchanged water) in an amount corresponding to the balance. The contents were stirred with a propeller stirring machine for 30 minutes or more and then filtered with a filter having a pore diameter of 3.0 μm to provide the black ink jet recording ink 1 of Example 1.

Examples 2 to 6 and Comparative Examples 1 to 3

Inks 2 to 6 of Examples 2 to 6 and inks 7 to 9 of Comparative Examples 1 to 3 were prepared by using the black pigment dispersion prepared in advance while changing the compositions of the water-soluble compounds and the like. Specifically, the respective inks of Examples and Comparative Examples were obtained in the same manner as in Example 1 except that components shown in Table 2 were used in amounts shown in Table 2.

2C as an ink jet recording head was used. The specifications are as shown in Table 3.

TABLE 3

| Specifications of recording head used in evaluation | |
|---|---|
| Length of nozzle array | 4 inch |
| Total number of nozzles per nozzle array | 4,800 |
| Ejection amount | 7.5 ng |
| L1: ejection orifice to heater center | 80 μm |
| L2: heater center to nozzle rear end | 135 μm |
| Total length of nozzle: L1 + L2 | 215 μm |
| Width of ejection orifice | 12 μm |
| Height of ejection orifice | 16.7 μm |
| Opening area | 200 μm$^2$ |

Resolubility and Sticking Property Test

An LXP5500 (manufactured by CANON FINETECH INC.) was used as an ink jet recording apparatus, and printing was performed under an environment having a temperature of 15° C. and a humidity of 10% as described below. Each ink shown in Table 2 was stored in the ink tank of the ink jet recording apparatus, and ink droplets were ejected one by one from 4,800 ejection orifices arrayed in line on the recording head having the above-mentioned specifications at a density of 1,200 dpi to perform nozzle check pattern printing for each ink. At that time, a Matte Label manufactured by CANON

TABLE 2

Compositions and physical properties of inks of Examples and Comparative Examples

| | Example | | | | | | Comparative Example | | | [part (s)] |
|---|---|---|---|---|---|---|---|---|---|---|
| | 1 | 2 | 3 | 4 | 5 | 6 | 1 | 2 | 3 | |
| Pigment in black pigment dispersion | 3.0 | 2.5 | 3.0 | 3.0 | 3.0 | 3.0 | 3.0 | 3.0 | 3.0 | |
| Ethylene urea | 11.0 | 12.0 | 11.0 | 11.0 | 11.0 | 11.0 | 10.0 | 12.0 | 11.0 | |
| Glycerin | 7.0 | 7.0 | 7.0 | 8.0 | 6.0 | 7.0 | 7.0 | 7.0 | 6.0 | |
| Triethylene glycol | 2.0 | 5.0 | 4.0 | 2.0 | 3.0 | | 3.0 | 2.0 | 2.0 | |
| Bishydroxyethyl sulfone | 2.0 | | | 2.0 | 2.0 | 2.0 | 2.0 | 2.0 | 2.0 | |
| Trimethylolpropane | | | | | | 2.0 | | | | |
| Acetylenol E100 | 0.5 | 0.5 | 0.5 | 0.5 | 0.5 | 0.5 | 0.5 | 0.5 | 0.5 | |
| BC-20 | 1.0 | 1.0 | 1.0 | 1.0 | 1.0 | 1.0 | 1.0 | 1.0 | 1.0 | |
| Pure water | Balance | Balance | Balance | Balance | Balance | Balance | Balance | Balance | Balance | |
| Content of ethylene urea in ink (%) | 11.0 | 12.0 | 11.0 | 11.0 | 11.0 | 11.0 | 10.0 | 12.0 | 11.0 | |
| Content of water-soluble compounds having hydrophilicity-hydrophobicity coefficient of 0.37 or less in ink (%) | 22.0 | 24.0 | 22.0 | 23.0 | 22.0 | 22.0 | 22.0 | 23.0 | 21.0 | |
| Ratio of amount of ethylene urea to amount of water-soluble compounds having hydrophilicity-hydrophobicity coefficient of 0.37 or less (%) | 50.0 | 50.0 | 50.0 | 47.8 | 50.0 | 50.0 | 45.5 | 52.2 | 52.4 | |
| Resolubility, sticking property (flowability at sticking) | OK | OK | OK | OK | OK | OK | NG | NG | NG | |
| Deposition of solid matter | OK | OK | OK | OK | OK | OK | OK | NG | NG | |

Evaluation

An image was formed by using each of the inks of Examples and Comparative Examples obtained in the foregoing, and an ink jet recording apparatus, and each ink was evaluated by a method to be described later. Table 2 shows the results of the evaluation. Specifically, an ink jet recording apparatus of a thermal system ("LXD5500" manufactured by CANON FINETECH INC.) was used as the ink jet recording apparatus. In addition, the apparatus including an ink jet head of the structure illustrated in FIGS. 1A to 1C and FIGS. 2A to FINETECH INC. was used as a medium (recording medium). After the above-mentioned test was conducted, the recording head was capped in an airtight manner. After the recording head was left for two weeks under an environment at 60° C., recovery operation was carried out. The condition of the nozzle check pattern printing at that time was evaluated with the following criteria.

OK: Normal printing can be carried out after one cleaning operation

NG: Normal printing can be carried out after two or more cleaning operations

Deposition of Solid Matter

After each ink was filled in the recording head having the above-mentioned specifications, the recording head was left at room temperature for two weeks without airtight capping. A tip of a nozzle was observed and was evaluated with the following criteria.

Evaluation Criteria

OK: No solid matter is deposited at the tip of the nozzle

NG: Deposition of a solid matter is acknowledged at the tip of the nozzle

As shown in Table 2, it was confirmed that in the cases of the inks of Examples 1 to 6, the nozzle was recovered by one cleaning operation and normal printing was able to be performed. A possible reason for the foregoing is that, as described later, as apparent from comparison with cases where the inks of Comparative Examples were used, the contents of the ethylene urea and water-soluble compounds in the ink fell within the ranges specified in the present invention, and as a result, sufficient resolubility and a sufficient sticking property were obtained.

In contrast to the inks of Examples, as shown in Table 2, the amount of the ethylene urea in the ink of Comparative Example 1 was less than 11 mass %, and resolubility upon mixing of a dried ink after the evaporation of the water in the ink with a new ink by a cleaning operation was poor, and hence two or more cleaning operations were needed. In the case of the ink of Comparative Example 2, the proportion of the amount of the ethylene urea in the total amount of the water-soluble compounds exceeded 50%, and as a result, the moisture-retaining property was not sufficient and the sticking property was poor. In addition, in the case of the ink of Comparative Example 3, a dried ink dissolved but a state where solid matter was deposited was established and hence the sticking property was poor.

Inks were similarly prepared by changing the pigment of the black pigment dispersion of Table 2 to the pigments of the respective colors obtained in the preparation of the cyan, magenta, and yellow dispersions, and the same evaluations as those in the case of the black ink were performed. As a result, each of the inks prepared by using the pigments of the pigment dispersion liquids of the respective colors showed suitable results as in the cases of the black inks of Examples. In addition, Comparative Examples showed poor results in terms of resolubility and the deposition of solid matter as in the black inks. It was confirmed from the foregoing that irrespective of which one of the cyan, magenta, and yellow pigment dispersions was used, an ink causing no deposition of solid matter, and having good resolubility and a good sticking property was obtained through such a design that the ink compositions specified in the present invention, in particular, those of the water-soluble compounds were satisfied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-185457, filed Sep. 6, 2013, which is hereby incorporated by reference herein in its entirety.

What is claimed is:

1. An ink jet recording ink, comprising:
    a pigment;
    water; and
    two kinds of nonionic surfactants,
    wherein the pigment comprises a resin-dispersed pigment dispersed with a (meth)acrylate-based random copolymer having an acid value of 100 mgKOH/g or more and 160 mgKOH/g or less.

2. An ink jet recording ink according to claim 1, wherein the ink further comprises water-soluble compounds,
    wherein the water-soluble compounds include at least ethylene urea and a water-soluble compound having a hydrophilicity-hydrophobicity coefficient defined by the following Equation (A) of 0.37 or less,
    wherein a total content of the water-soluble compounds is 22 mass % or more and 50 mass % or less with respect to a total amount of the ink, and
    wherein a content of the ethylene urea is 11.0 mass % or more with respect to the total amount of the ink, and a proportion of an amount of the ethylene urea in a total amount of the water-soluble compounds is 50% by mass or less, $$\text{Hydrophilicity-hydrophobicity coefficient} = ((\text{water activity value of 20\% aqueous solution}) - (\text{molar fraction of water in 20\% aqueous solution}))/(1 - (\text{molar fraction of water in 20\% aqueous solution})). \quad \text{Equation A}$$

3. An ink jet recording ink according to claim 2, wherein the total content of the water-soluble compounds is 22 mass % or more and 24 mass % or less with respect to the total amount of the ink.

4. An ink jet recording ink according to claim 2, wherein the water-soluble compound having a hydrophilicity-hydrophobicity coefficient of 0.37 or less is selected from the group consisting of glycerin, triethylene glycol, and bishydroxyethyl sulfone.

5. An ink jet recording ink according to claim 1, wherein the two kinds of nonionic surfactants include an acetylene glycol-based surfactant and a polyoxyethylene alkyl ether.

6. An ink jet recording method comprising ejecting ink from a nozzle array using a thermal system to conduct recording,
    wherein each nozzle of the nozzle array has an opening area of from 100 $\mu m^2$ to 350 $\mu m^2$, and
    wherein the ink is the ink according to claim 1.

7. An ink jet recording method comprising ejecting ink from a nozzle array using a thermal system to conduct recording,
    wherein a total number of nozzles per the nozzle array is 1,200 or more,
    wherein a length of the nozzle array is 2 inches or more, and
    wherein the ink is the ink according to claim 1.

8. An ink jet recording head having ink stored therein for ejecting the ink from a nozzle array using a thermal system,
    wherein each nozzle of the nozzle array has an opening area of from 100 $\mu m^2$ to 350 $\mu m^2$,
    wherein a total number of nozzles per the nozzle array is 1,200 or more,
    wherein a length of the nozzle array is 2 inches or more, and
    wherein the stored ink is the ink according to claim 1.

9. An ink jet recording head having ink stored therein for ejecting the ink from a nozzle array using a thermal system, the ink jet recording head comprising:
    a common liquid chamber communicating with a plurality of nozzle flow paths serving as the nozzle array;
    an opening portion communicating with the common liquid chamber;
    a main liquid supply chamber communicating with the opening portion;
    a liquid supply path communicating with the main liquid supply chamber;

a liquid supply chamber communicating with the liquid supply path;
a supply filter provided so as to partition the liquid supply chamber into a first liquid supply chamber and a second liquid supply chamber from an upstream side along a flow during supply of liquid;
a gas-liquid separation portion provided in part of the main liquid supply chamber; and
an air chamber communicating with the gas-liquid separation portion,
the plurality of nozzle flow paths, the common liquid chamber, the opening portion, the main liquid supply chamber, the liquid supply path, the liquid supply chamber, the supply filter, the gas-liquid separation portion, and the air chamber being disposed on a plane parallel to a plane including an arrangement direction of the plurality of nozzle flow paths and an ejection direction of the liquid,
the main liquid supply chamber, the liquid supply path, the supply filter, the gas-liquid separation portion, and the air chamber being disposed without being laminated respectively, and
the stored ink is the ink according to claim 1.

10. An ink jet recording apparatus, comprising:
an ink storage portion; and
a recording head for ejecting ink,
wherein the ink storage portion stores the ink according to claim 1, and
wherein the recording head is the ink jet recording head according to claim 8.

* * * * *